(12) United States Patent
Gupta

(10) Patent No.: US 12,388,891 B2
(45) Date of Patent: Aug. 12, 2025

(54) UPLOADING FILES VIA DISTRIBUTED DEVICES

(71) Applicant: Citrix Systems, Inc., Fort Lauderdale, FL (US)

(72) Inventor: R V Shouri Gupta, Bangalore (IN)

( * ) Notice: Subject to any disclaimer, the term of this patent is extended or adjusted under 35 U.S.C. 154(b) by 621 days.

(21) Appl. No.: 17/711,166

(22) Filed: Apr. 1, 2022

(65) Prior Publication Data

US 2023/0319128 A1  Oct. 5, 2023

(51) Int. Cl.
| | | |
|---|---|---|
| H04L 67/104 | (2022.01) | |
| H04L 9/40 | (2022.01) | |
| H04L 67/06 | (2022.01) | |
| H04W 4/02 | (2018.01) | |
| H04W 4/70 | (2018.01) | |
| H04W 4/80 | (2018.01) | |
| H04W 76/10 | (2018.01) | |

(52) U.S. Cl.
CPC ............. *H04L 67/06* (2013.01); *H04W 4/023* (2013.01); *H04W 4/70* (2018.02); *H04W 4/80* (2018.02); *H04W 76/10* (2018.02)

(58) Field of Classification Search
CPC ......... H04W 4/70; H04W 4/80; H04W 76/10; H04W 4/023; H04L 67/06; H04L 67/104; H04L 63/0407; H04L 63/0442
See application file for complete search history.

(56) References Cited

U.S. PATENT DOCUMENTS

| | | | | |
|---|---|---|---|---|
| 11,368,516 B1 * | 6/2022 | Lee | ........................ | H04L 67/561 |
| 11,539,783 B1 * | 12/2022 | Gupta | ................... | H04W 12/04 |
| 2004/0044740 A1 * | 3/2004 | Cudd | .................. | G06F 16/9574 |
| | | | | 709/217 |
| 2005/0273592 A1 * | 12/2005 | Pryor | .................... | H04L 63/123 |
| | | | | 713/150 |
| 2006/0153198 A1 * | 7/2006 | Chadha | ................. | H04L 69/329 |
| | | | | 370/395.2 |
| 2006/0271688 A1 * | 11/2006 | Viger | ................. | H04N 1/00244 |
| | | | | 709/227 |
| 2007/0136297 A1 * | 6/2007 | Choe | ....................... | H04L 67/34 |
| 2007/0294088 A1 * | 12/2007 | Thelen | ................ | G07F 17/3255 |
| | | | | 705/1.1 |
| 2008/0108437 A1 * | 5/2008 | Kaarela | ............... | H04L 67/1061 |
| | | | | 463/43 |
| 2008/0133706 A1 * | 6/2008 | Chavez | ................. | H04L 67/104 |
| | | | | 709/218 |
| 2008/0147683 A1 * | 6/2008 | Chutczer | ............ | H04N 21/4334 |

(Continued)

OTHER PUBLICATIONS

U.S. Appl. No. 17/546,490, filed Dec. 9, 2021.

*Primary Examiner* — Chris Parry
*Assistant Examiner* — Hassan Abdur-Rahman Khan

(57) ABSTRACT

In one disclosed method, a method performed by a computing system involves determining that a file is to be uploaded from a first remote device to the computing system; sending, to the first remote device, first data to enable a wireless connection to be established between the first remote device and a second remote device; receiving, from the first remote device, a first portion of the file; receiving, from the second remote device, a second portion of the file, the second remote device having received the second portion of the file from the first remote device via the wireless connection; and merging the first portion of the file and the second portion of the file to generate a copy of the file.

20 Claims, 18 Drawing Sheets

(56) References Cited

U.S. PATENT DOCUMENTS

| | | | | |
|---|---|---|---|---|
| 2009/0094600 A1* | 4/2009 | Sargaison | A63F 13/69 | 717/176 |
| 2009/0234967 A1* | 9/2009 | Yu | H04L 67/104 | 709/232 |
| 2010/0161755 A1* | 6/2010 | Li | H04L 67/104 | 709/217 |
| 2011/0010258 A1* | 1/2011 | Chavez | G06Q 30/0641 | 705/26.1 |
| 2011/0010421 A1* | 1/2011 | Chavez | H04L 12/6418 | 709/219 |
| 2011/0029968 A1* | 2/2011 | Sanders | G06F 9/45537 | 718/1 |
| 2012/0011247 A1* | 1/2012 | Mallik | H04L 67/104 | 709/224 |
| 2012/0259988 A1* | 10/2012 | Erringer | H04L 67/104 | 709/228 |
| 2013/0132580 A1* | 5/2013 | Rothschild | H04L 69/14 | 709/227 |
| 2013/0326494 A1* | 12/2013 | Nunez | H04L 41/082 | 717/172 |
| 2014/0280433 A1* | 9/2014 | Messerli | H04L 67/10 | 709/201 |
| 2014/0280604 A1* | 9/2014 | Ahiska | H04L 67/10 | 709/205 |
| 2015/0189032 A1* | 7/2015 | Duquene | H04L 51/046 | 709/204 |
| 2016/0057199 A1* | 2/2016 | Aziz | H04L 51/10 | 709/204 |
| 2016/0119739 A1* | 4/2016 | Hampel | H04W 4/70 | 370/329 |
| 2017/0318098 A1* | 11/2017 | Sanghvi | H04L 69/03 | |
| 2018/0006895 A1* | 1/2018 | Burba | H04L 67/52 | |
| 2018/0063232 A1* | 3/2018 | Chau | H04L 67/108 | |
| 2019/0232164 A1* | 8/2019 | Griffais | A63F 13/79 | |
| 2020/0226101 A1* | 7/2020 | Dhanabalan | H04L 65/1083 | |
| 2020/0274922 A1* | 8/2020 | Lisewski | H04W 76/40 | |
| 2020/0404573 A1* | 12/2020 | Athlur | H04W 4/06 | |
| 2021/0037076 A1* | 2/2021 | Long | H04L 65/612 | |
| 2022/0078236 A1* | 3/2022 | Yonekura | G06F 16/182 | |
| 2022/0083509 A1* | 3/2022 | Dhanabalan | H04L 67/01 | |
| 2023/0019437 A1* | 1/2023 | Yonekura | H04L 67/06 | |
| 2023/0319128 A1* | 10/2023 | Gupta | H04W 4/80 | 709/219 |
| 2023/0344895 A1* | 10/2023 | Jiang | H04L 67/1078 | |

* cited by examiner

UPLOADING FILES VIA DISTRIBUTED DEVICES

BACKGROUND

Various file sharing systems have been developed that allow users to share files or other data. ShareFile®, offered by Citrix Systems, Inc., of Fort Lauderdale, FL, is one example of such a file sharing system.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises determining, by a computing system, that a file is to be uploaded from a first remote device to the computing system; sending, from the computing system to the first remote device, first data to enable a wireless connection to be established between the first remote device and a second remote device; receiving, by the computing system and from the first remote device, a first portion of the file; receiving, by the computing system and from the second remote device, a second portion of the file, the second remote device having received the second portion of the file from the first remote device via the wireless connection; and merging, by the computing system, the first portion of the file and the second portion of the file to generate a copy of the file.

In some embodiments, a method comprises determining, by a computing system, that a file is to be uploaded from a first remote device to the computing system; determining, by the computing system, that at least a second remote device is available to assist the first remote device in uploading the file to the computing system; receiving, by the computing system and from the first remote device, a first portion of the file; receiving, by the computing system and from the second remote device, a second portion of the file, the second remote device having received the second portion of the file from the first remote device; and merging, by the computing system, the first portion of the file and the second portion of the file to generate a copy of the file.

In some embodiments, a method comprises determining, by a first device, that a file is to be uploaded from the first device to a remote computing system; establishing, by the first device, a wireless connection with at least a second device in proximity of the first device; dividing, by the first device, the file into at least a first portion and a second portion; sending, from the first device to the second device via the wireless connection, the first portion of the file; and sending, from the first device and to the remote computing system, the second portion of the file.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
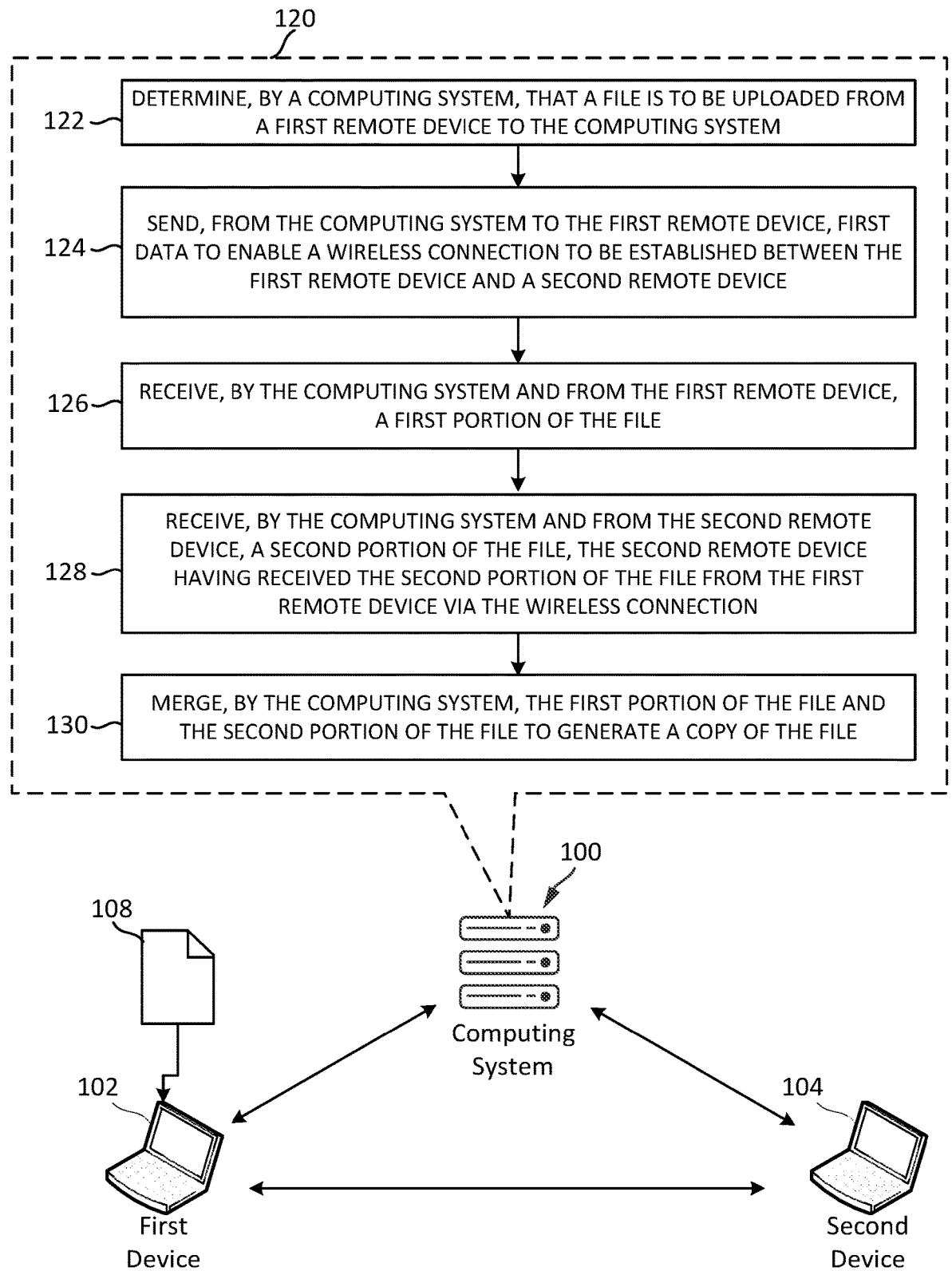
FIG. 1A is a high-level diagram illustrating a computing system orchestrating collaborative uploading of a file by multiple client devices within a proximity, in accordance with some embodiments of the present disclosure.

For purposes of reading the description of the various embodiments below, the following descriptions of the sections of the specification and their respective contents may be helpful:

Section A provides an introduction to example embodiments of a system for uploading files via distributed devices;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes example embodiments of systems for providing file sharing over networks;

Section F provides a more detailed description of example embodiments of the system introduced in Section A; and Section G describes example implementations of methods, systems/devices, and computer-readable media in accordance with the present disclosure.

A. Introduction to Illustrative Embodiments of a System for Uploading Files Using Distributed Devices Various file sharing systems have been developed that allow users to share files with other users over a network. However, when uploading a file to a server, such as a large file, it may be a lengthy process and may demand processing resources from the uploading device during the upload process. Additionally, upload speeds are oftentimes significantly slower than download speeds, thus further increasing the file upload time.

The inventors have recognized and appreciated that in many scenarios where a user is attempting to upload a file, such as to a file sharing system, there may be a group of users that also are users of the same file sharing system. Additionally, at least some of the group of users may be physically located within a proximity of each other, such as in an office environment or at a conference. Thus, instead of an individual user attempting to upload the whole file to a file server of the file sharing system, an opportunity may exist, based on the proximity of users and their respective devices, for portions of the file to be distributed to the users' devices within the proximity and for the devices to individually upload portions of the file. The file portions may then be merged back into the file by the file server.

An example file sharing system 504 that includes a file server with which the collaborative uploading techniques described herein may be employed is described below (in Section E) in connection with FIGS. 5A-C. As explained in Section E, in some implementations, one client device 202 may upload a file 502 (shown in FIG. 5A) to a central repository of the file sharing system 504, such as the storage medium(s) 512 shown in FIGS. 5A-C, and another client device 202 may then download a copy of that file 502 from the same repository. As Section E also describes, in some implementations, an access management system 506 may regulate the circumstances in which files 502 may be uploaded and/or downloaded to/from a storage system 508 (including the storage medium 512(s)) by various client devices 202.

Offered are systems and techniques for dividing a file into multiple data fragments (referred to herein as "chunks") and uploading different ones of those chunks from respective client devices 202 that are located within a physical proximity of one another to a file server (e.g., within the file sharing system 504). Because the respective client devices 202 are located within the same physical proximity, the device originating the file upload may send different chunks of the file to individual client devices 202 (e.g., via one or more wireless peer-to-peer connections) and thus enable the respective client devices 202 to individually upload their respective chunks to the file server. In some implementations, the file server may assemble the chunks to generate a complete copy of the file.

This approach may simplify the upload process for a user/client device and provide a method to upload data objects seamlessly in an efficient method that effectively utilizes available resources. Devices with hardware limitations, e.g., limited processing power, and/or devices connected to networks with limited bandwidth availability, e.g., certain cellular networks, may upload files quickly and seamlessly with this approach. This may provide for the upload processing time for the uploading device and the receiving the storage system 508 to be reduced and enable the storage system 508 of the file sharing system 504 to cater to other file requests sooner.

FIG. 1A is a high-level diagram illustrating how a computing system 100 may facilitate collaborative uploading of a file 108 from multiple client devices 202 (e.g., a first device 102 and a second device 104) within a proximity of one another, in accordance with some embodiments of the present disclosure. In some embodiments, the computing system 100 may be part of the file sharing system 504. In other embodiments, the file sharing system 504 may be in communication with the computing system 100. In some embodiments, the computing system 100 may include one or more servers 204 (examples of which are described below in relation to FIG. 2). For example, in some implementations, the server(s) 204 used to implement the computing system 100 may be included amongst the server(s) 204b of the storage system 508 described in Section E.

The first device 102 and the second device 104 may be respective client devices 202 (examples of which are described in Sections B-D below). Although only two such client devices 202 are shown in FIG. 1A, it should be appreciated that additional client devices 202 may be employed in some implementations. A client device 202 (e.g., the first device 102) may be in communication with the computing system 100 using one or more networks 206 (examples of which are described below). A client device 202 (e.g., the first device 102) may store the file 108. In some implementations, a client application may be installed on the client devices 202 and a user may use such a client application to request to upload the file 108 to the computing system 100. In some implementations, the user of client device 202 may alternatively use a browser-based client application to request the upload of the file 108 to the computing system 100. The file management application 513 described in Section E (in connection with FIG. 5A) is an example of a client application that may be used for such purposes.

A first example routine 120 that may be performed by the computing system 100 is illustrated in FIG. 1A. As shown in FIG. 1A, at a step 122 of the routine 120, the computing system 100 may determine that a file 108 is to be uploaded from a first device 102 to the computing system 100. In some implementations, such determination may be based on the receipt of a request from the first device 102 to upload the file 108. Further, in some implementations, such a request to upload the file 108 may include an indication of the client devices 202 (e.g., the second device 104) within a physical proximity of the first device 102.

In some implementations, the first device 102 may detect one or more other client devices 202 within the same vicinity. For example, in some implementations, the first device 102 may use a short range wireless radio, such as a Bluetooth or Wi-Fi transceiver, to identify one or more other client devices 202 within a physical proximity. In some implementations, the detection of one or more other client devices 202 within a proximity may be performed by the first device 102 in response to the user making a request, via a client application, to upload the file 108 to the computing system 100.

At a step 124 of the routine 120, the computing system 100 may send first data to the first device 102 to enable a wireless connection to be established between the first device 102 other client devices 202 (e.g., the second device 104) within a physical proximity of the first device 102. In some implementations, the computing system 100 may configure such data to cause the first device 102 to establish a wireless network to which the second device 104 may connect. In some implementations, the first data sent from the computing system 100 to the first device 102 may enable peer-to-peer communication between the first device 102 and the second device 104. For example, the computing system 100 may provide the first device 102 with instructions for establishing a Wi-Fi hotspot, with the instructions indicating the Wi-Fi hotspot name, the service set identifier (SSID) for the hotspot, and a password to be used to access the hotspot.

In some implementations, the computing system 100 may additionally or alternatively send second data to the second device 104 to enable a wireless connection to be established between the second device 104 and the first device 102. In some implementations, the computing system 100 may configure such data to enable the second device 104 to connect to the wireless network established by the first device 102. In some implementations, the second data the computing system 100 sends to the second device 104 may enable peer-to-peer communication between the second device 104 and the first device 102, thus enabling a transfer of the second portion of the file 108 from the first device 102. For example, in some implementations, the second data may include the Wi-Fi name and the password for connecting to the Wi-Fi hotspot of the first device 102.

In some implementations, the computing system 100 may additionally transmit a request to the second device 104 (and perhaps other client devices 202 within a physical proximity of the first device 102) for authorization to assist in uploading the file 108 from the first device 102 to the computing system 100 using collaborative uploading. The devices receiving the authorization request (e.g., the second device 104) may output prompts (e.g., via client applications) for user authorization to assist in uploading the file 108 with collaborative uploading. The respective client devices 202 may transmit the user authorization or denial to the computing system 100.

In some implementations, the computing system 100 may determine a proximity group, for example, based on the one or more client devices 202 that (A) were identified by the requesting client device 202 (e.g., the first device 102) as being within a physical proximity, and (B) provided authorization to assist in uploading the file 108 using collaborative uploading. In some implementations, the computing system 100 may transmit to the first device 102 information indicating the number of client devices 202 in the proximity group and/or the identity of those client devices 202.

As shown in FIG. 1A, at step 126 of the routine 120, the computing system 100 may receive from the first device 102 a first portion of the file. At a step 128 of the routine 120, the computing system 100 may receive, from the second device 104, a second portion of the file 108. In some implementations, the second device 104 may have received the second portion of the file 108 from the first devices 102, such as via a peer-to-peer communication channel, as described above.

At a step 130 of the routine 120, the computing system 100 may merge the first portion of the file 108 and the second portion of the file 108 to generate a copy of the file 108. In some implementations, the computing system 100 may send a first key (e.g., a public key) to the first device 102 to encrypt the file 108 or the file portions of the file 108. When encryption is employed, the computing system 100 may decrypt the copy of the file 108 or the received file portions using a second key (e.g., a private key).

Figure 1B:
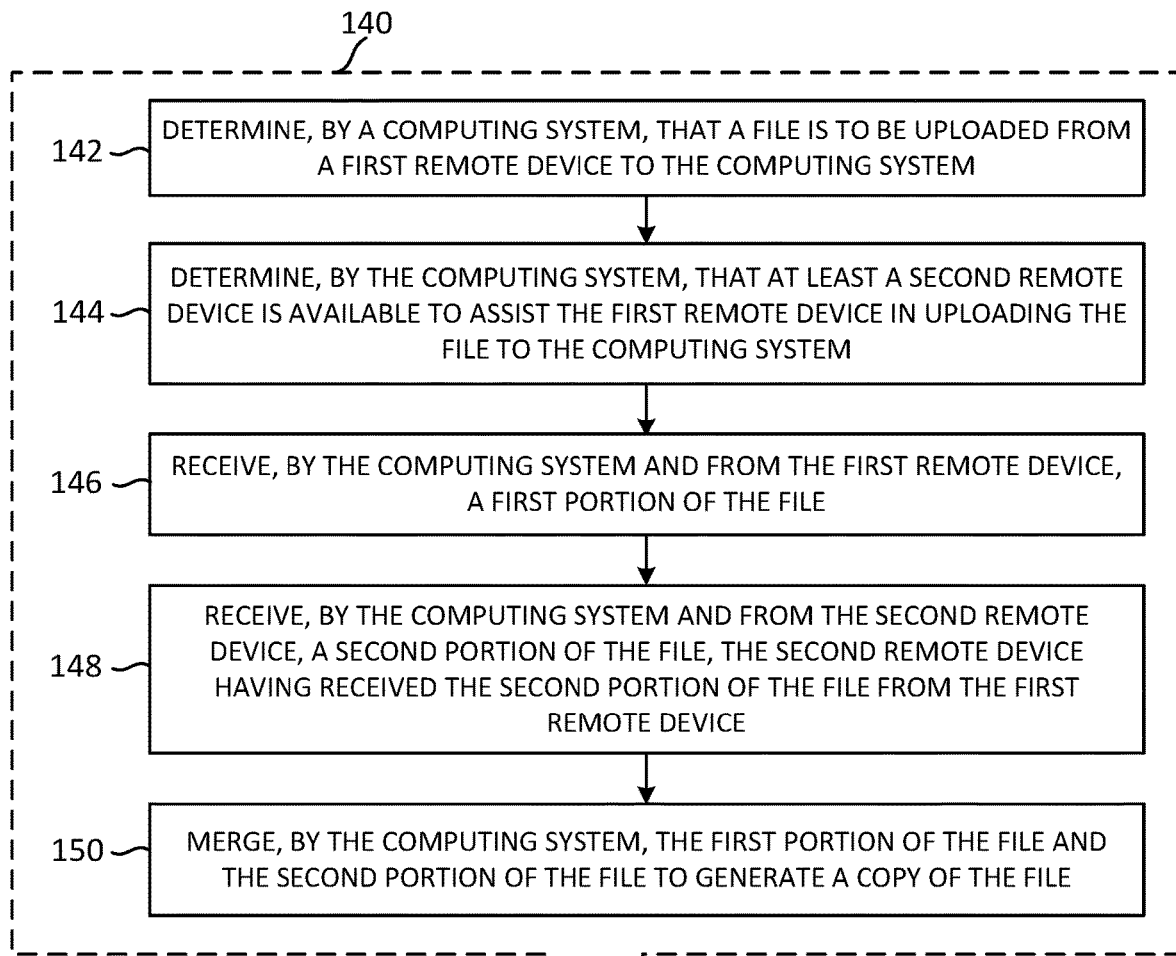
FIG. 1B is a high-level diagram illustrating a computing system orchestrating collaborative uploading of a file by multiple client devices within a proximity, in accordance with some embodiments of the present disclosure.
Figure 1B:
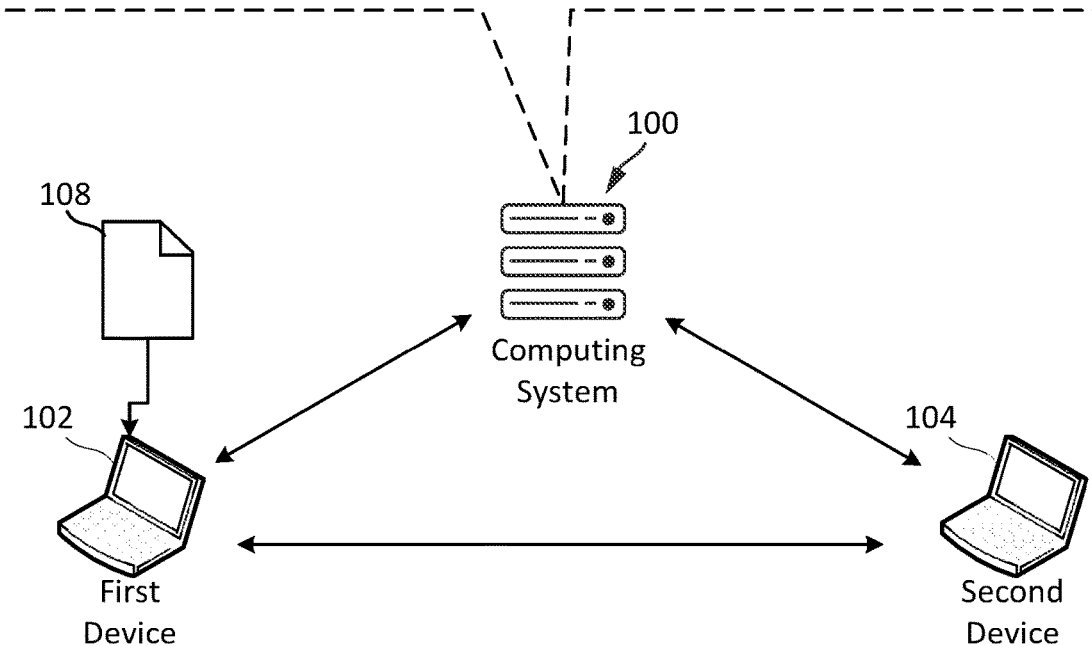

A second example routine 140 that may be performed by the computing system 100 is illustrated in FIG. 1B. As shown in FIG. 1B, at a step 142 of the routine 140, the computing system 100 may determine that a file 108 is to be uploaded from a first device 102 to the computing system 100. In some implementations, the determination may be based on receipt of a request from the first device 102 to upload the file 108. Further, in some implementations, such a request to upload the file 108 may include an indication of the client devices 202 (e.g., the second device 104) within a physical proximity of the first device 102.

At a step 144 of the routine 140, the computing system 100 may determine that at least a second device 104 is available to assist the first device 102 in uploading the file 108 to the computing system 100. In some implementations, the first device 102 may detect one or more other client devices 202 within the same vicinity. For example, in some implementations, the first device 102 may use a short range wireless radio, such as a Bluetooth or Wi-Fi transceiver, to identify one or more other client devices 202 within a physical proximity. In some implementations, the detection of one or more other client devices 202 within a proximity may be performed by the first device 102 in response to the user making a request, via a client application, to upload the file 108 to the computing system 100.

In some implementations, the computing system 100 may send first data to the first device 102 to enable a wireless connection to be established between the first device 102 other client devices 202 (e.g., the second device 104) within a physical proximity of the first device 102. In some implementations, the computing system 100 may configure such data to cause the first device 102 to establish a wireless network to which the second device 104 may connect. In some implementations, the first data sent from the computing system 100 to the first device 102 may enable peer-to-peer communication between the first device 102 and the second device 104. For example, the computing system 100 may provide the first device 102 with instructions for establishing a Wi-Fi hotspot, with the instructions indicating the Wi-Fi hotspot name, the service set identifier (SSID) for the hotspot, and a password to be used to access the hotspot.

In some implementations, the computing system 100 may additionally or alternatively send second data to the second device 104 to enable a wireless connection to be established between the second device 104 and the first device 102. In some implementations, the computing system 100 may configure such data to enable the second device to connect to the wireless network established by the first device 102. In some implementations, the second data the computing system 100 sends to the second device 104 may enable peer-to-peer communication between the second device 104 and the first device 102, thus enabling a transfer of the second portion of the file 108 from the first device 102. For example, in some implementations, the second data may include the Wi-Fi name and the password for connecting to the Wi-Fi hotspot of the first device 102.

In some implementations, the computing system 100 may additionally transmit a request to the second device 104 (and perhaps other client devices 202 within a physical proximity of the first device 102) for authorization to assist in uploading the file 108 from the first device 102 to the computing system 100 using collaborative uploading. The devices receiving the authorization request (e.g., the second device 104) may output prompts (e.g., via client applications) for user authorization to assist in uploading the file 108 with collaborative uploading. The respective client devices 202 may transmit the user authorization or denial to the computing system 100.

In some implementations, the computing system 100 may determine a proximity group, for example, based on the one or more client devices 202 that (A) were identified by the requesting client device 202 (e.g., the first device 102) as being within a physical proximity, and (B) provided authorization to assist in uploading the file 108 using collaborative uploading. In some implementations, the computing system 100 may transmit to the first device 102 information indicating the number of client devices 202 in the proximity group and/or the identity of those client devices 202.

As shown in FIG. 1B, at step 146 of the routine 140, the computing system 100 may receive from the first device 102 a first portion of the file. At a step 148 of the routine 140, the computing system 100 may receive, from the second device 104, a second portion of the file 108. In some implementations, the second device 104 may have received the second portion of the file 108 from the first devices 102, such as via the peer-to-peer communication channel, as described above.

At step 150 of the routine 140, the computing system 100 may merge the first portion of the file 108 and the second portion of the file 108 to generate a copy of the file 108. In some implementations, the computing system 100 may send a first key (e.g., a public key) to the first device 102 to encrypt the file 108 or the file portions of the file 108. When encryption is employed, the computing system 100 may decrypt the copy of the file 108 or the received file portions using a second key (e.g., a private key).

Figure 1C:
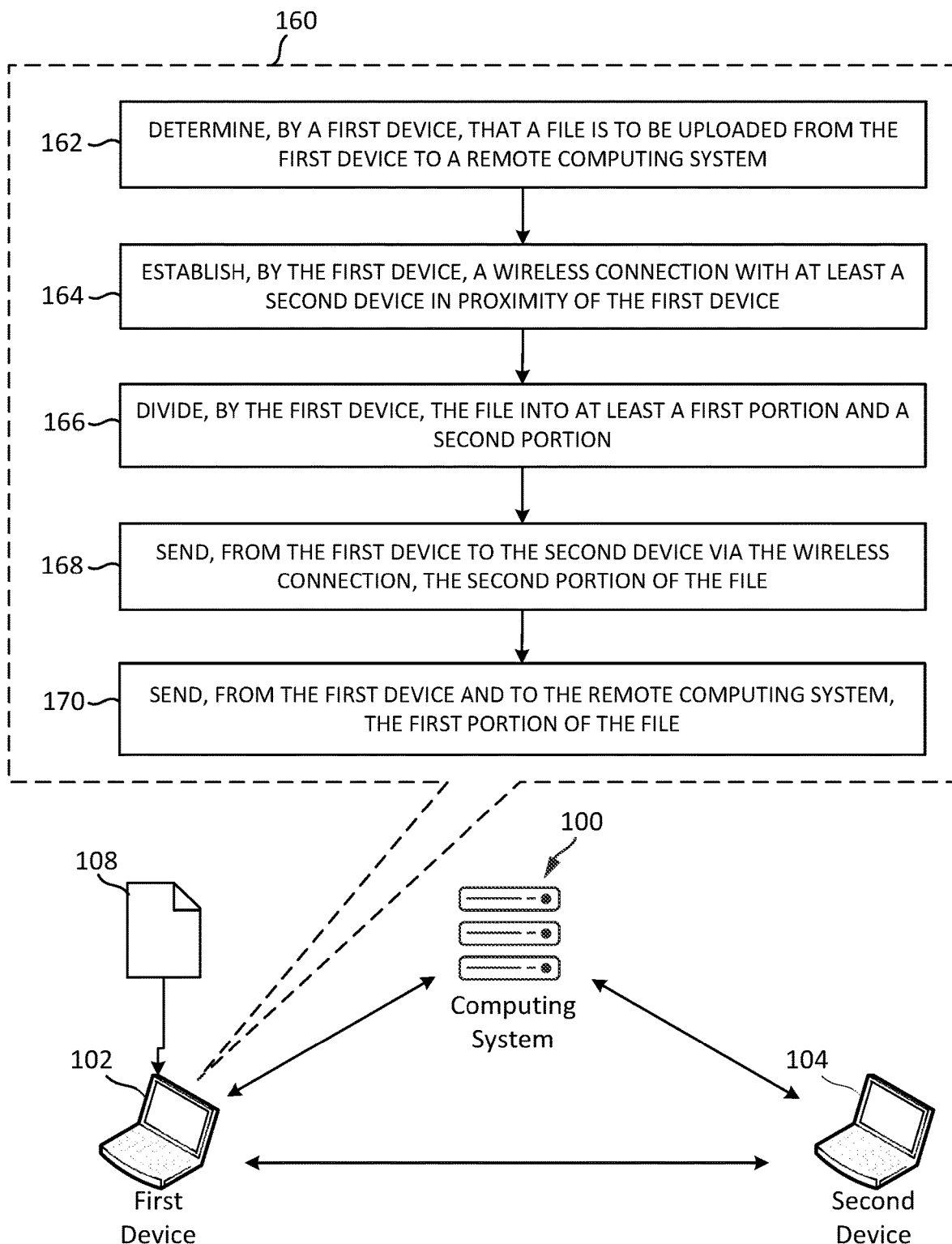
FIG. 1C is a high-level diagram illustrating a host device initiating a collaborative upload of a file for one or more client devices within a proximity, in accordance with some embodiments of the present disclosure.

FIG. 1C shows an example routine 160 that may be performed by a client device 202 (e.g., the first device 102) to orchestrate a collaborative upload of a file 108 by multiple client devices 202 (e.g., by at least the first device 102 and the second device 104) within a proximity of one another, in accordance with some embodiments of the present disclosure. As shown in FIG. 1C, at step 162 of the routine 160, the first device 102 may determine that a file 108 is to be uploaded from the first device 102 to the computing system 100.

In some implementations, the first device 102 may determine that at least one client device 202 (e.g., the second device 104) is within a proximity of the first device 102. In some implementations, the determination that the second device 104 is within a proximity of the first device 102 may be in response to the first device 102 detecting a Bluetooth transmission identifying the second device 104. In some implementations, the first device 102 may send to the computing system 100 an indication that the second device 104 is within the proximity of the first device 102. As noted above, in some implementations, the computing system 100 may be a part of the file sharing system 504 (shown in FIGS. 5A-C), and the file 108 may be stored in the storage system 508.

At step 164 of the routine 160, the first device 102 may establish a wireless connection with at least the second device 104 within a proximity of the first device 102. In some implementations, after sending the computing system 100 the indication that the second device 104 is within the proximity of the first device 102, the first device 102 may receive, from the computing system 100, data to enable a wireless connection to be established between the first device 102 and the second device 104. For example, as noted above, in some implementations, the first device 102 may receive instructions from the computing system 100 to establish a Wi-Fi hotspot, and the computing system 100 may additionally send to the second device 104 instructions for connecting to that hotspot. Accordingly, in such implementations, the first device 102 may establish a wireless connection with the second device 104 as a result of the second device 104 connecting to the Wi-Fi hotspot established by the first device 102.

In some implementations, the first device 102 may receive information indicating the number of client devices 202 in the proximity group and/or the identity of those client devices 202. At step 166 of the routine 160, the first device 102 may divide the file 108 into at least a first portion and a second portion. The number of client devices 202 in the proximity group may be used by the first device 102 to determine the number of file portions to divide the file 108. In some implementations, the first device 102 may receive a key (e.g., a public key) from the computing system 100. The first device 102 may encrypt the file 108 or the file portions of file 108 using the received key.

At step 168 of the routine 160, the first device 102 may send, to the second device 104, the second portion of the file 108 via the wireless connection established between the first device 102 and the second device 104, such as via a Wi-Fi hotspot of the first device 102, as described above. At step 170 of the routine 160, the first device 102 may send, to the computing system 100, the first portion of the file 108.

Additional details and example implementations of embodiments of the present disclosure are set forth below in Section F, following a description of example systems and network environments in which such embodiments may be deployed.

B. Network Environment

Figure 2:
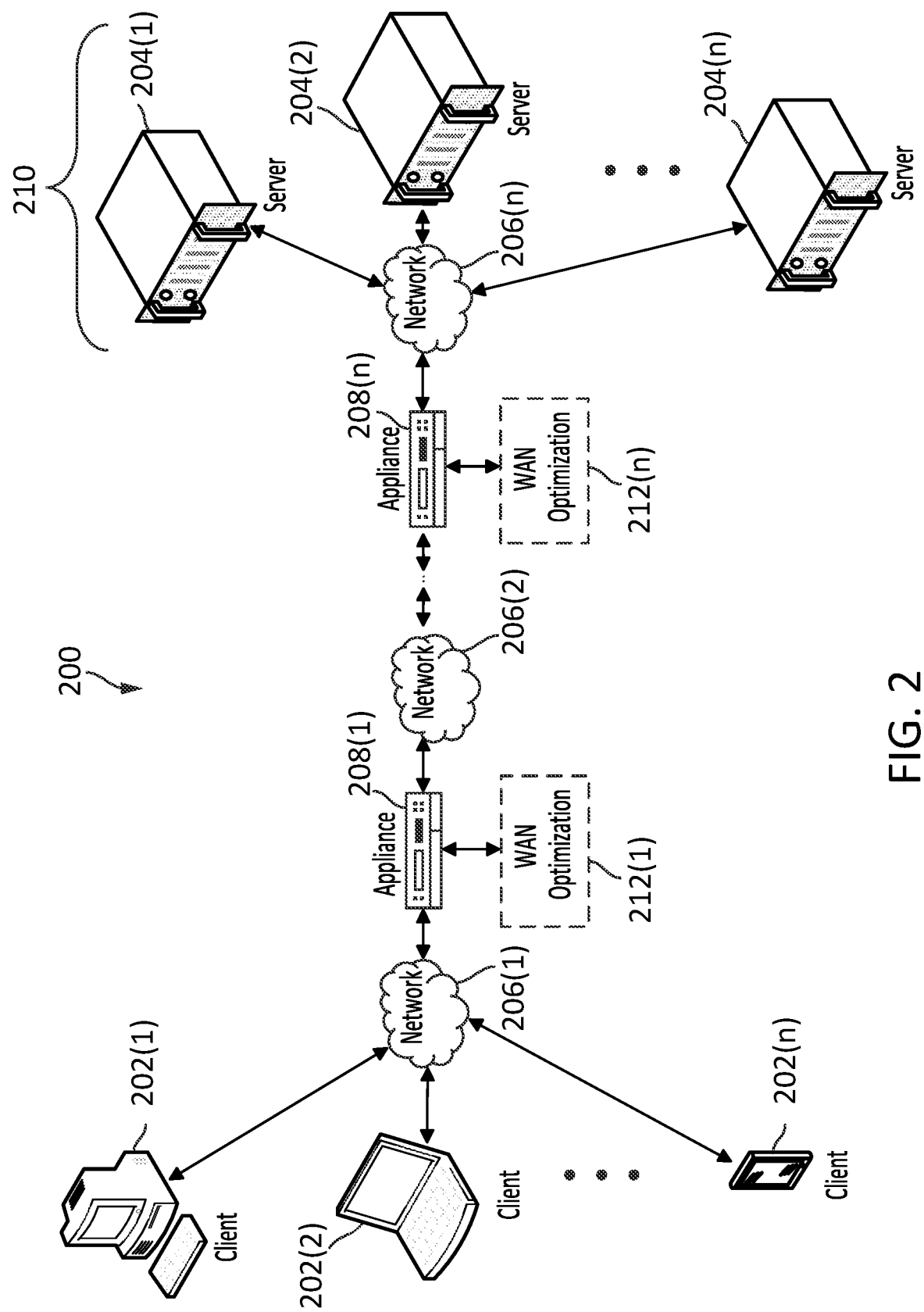
FIG. 2 is a diagram of a network environment in which some embodiments of the present disclosure may be deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the client devices 202 and the servers 204, in other embodiments, the client devices 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of an organization.

C. Computing Environment

Figure 3:
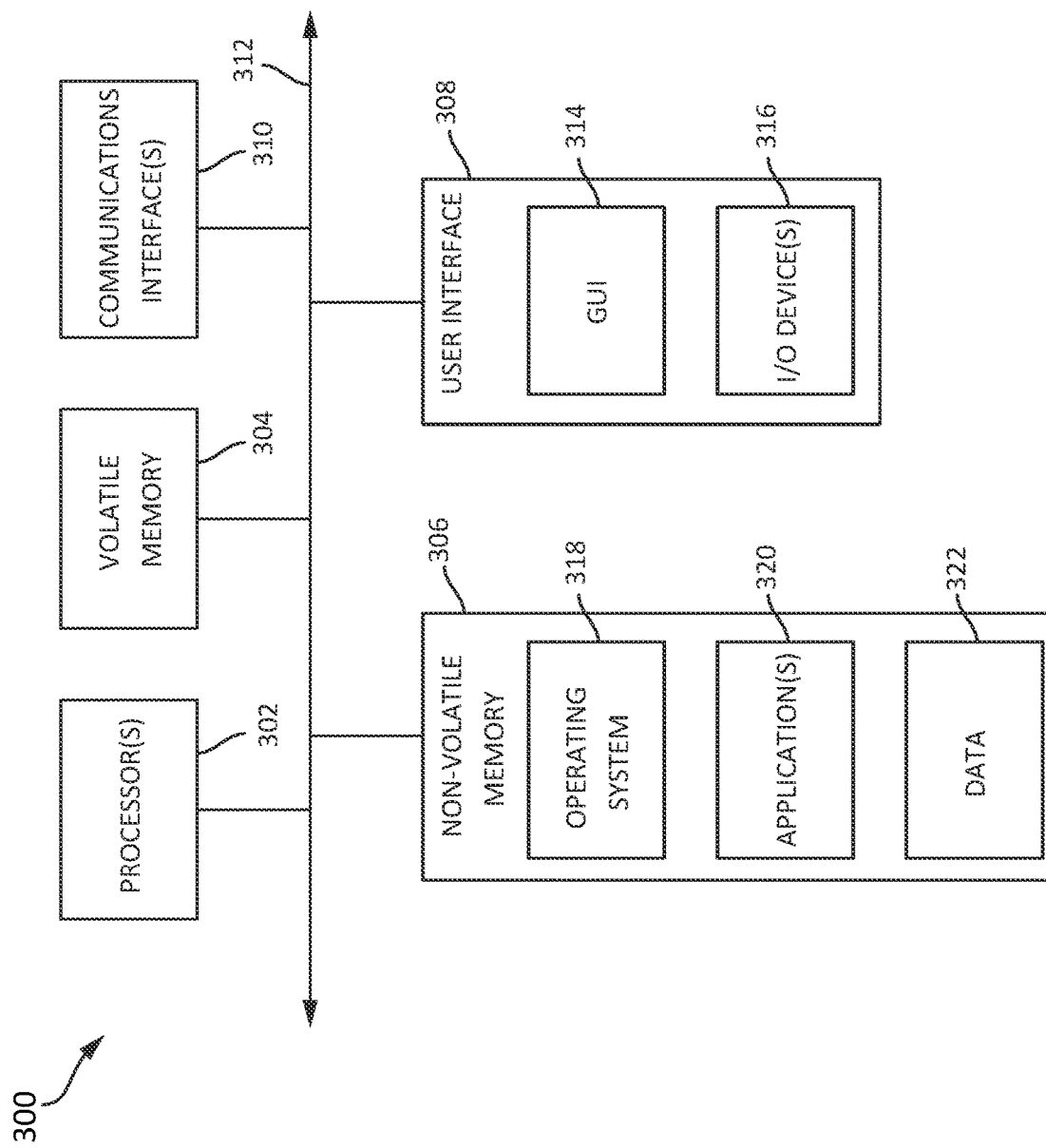
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
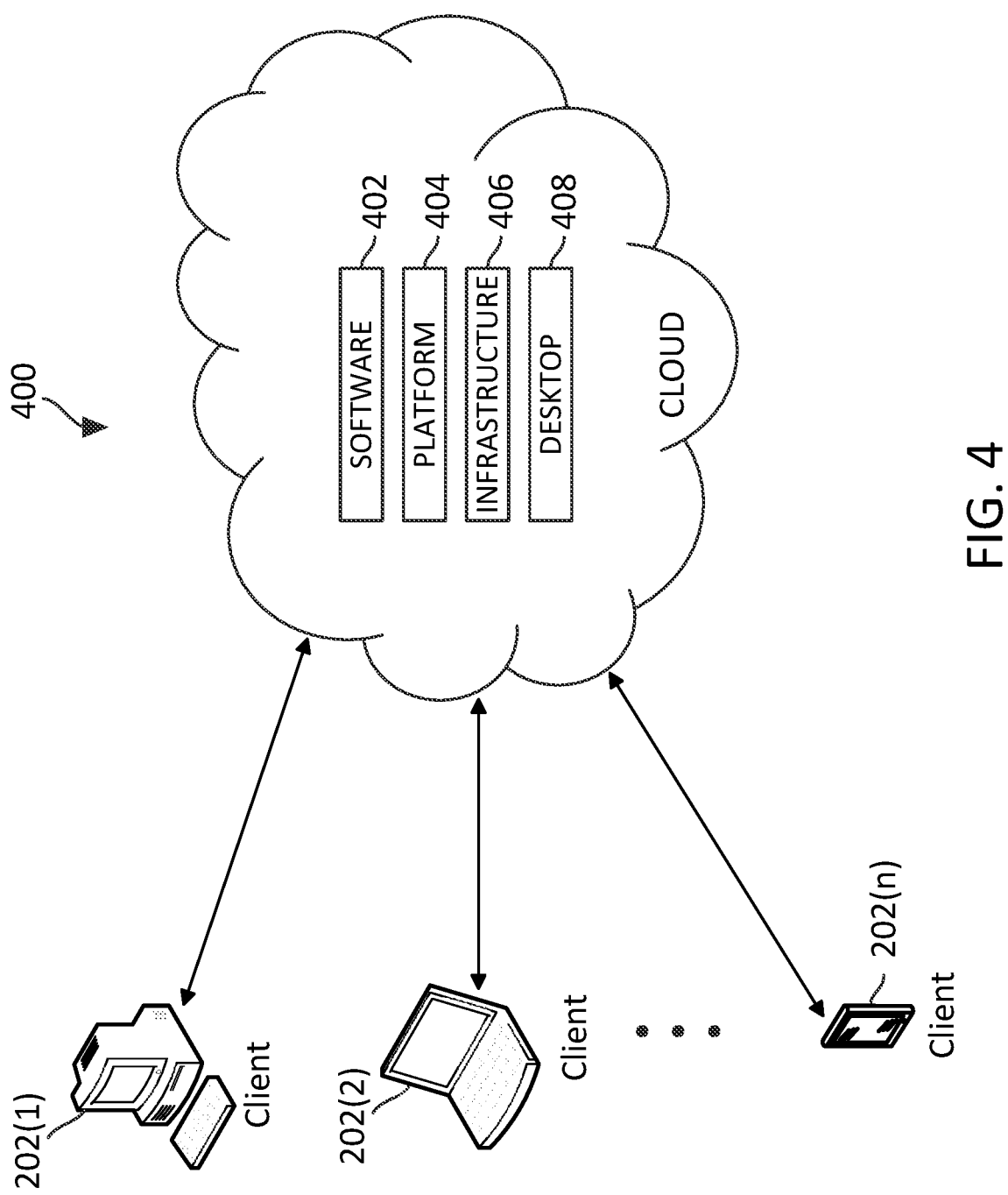
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile® from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Systems and Methods for Providing File Sharing Over Network(s)

Figure 5A:
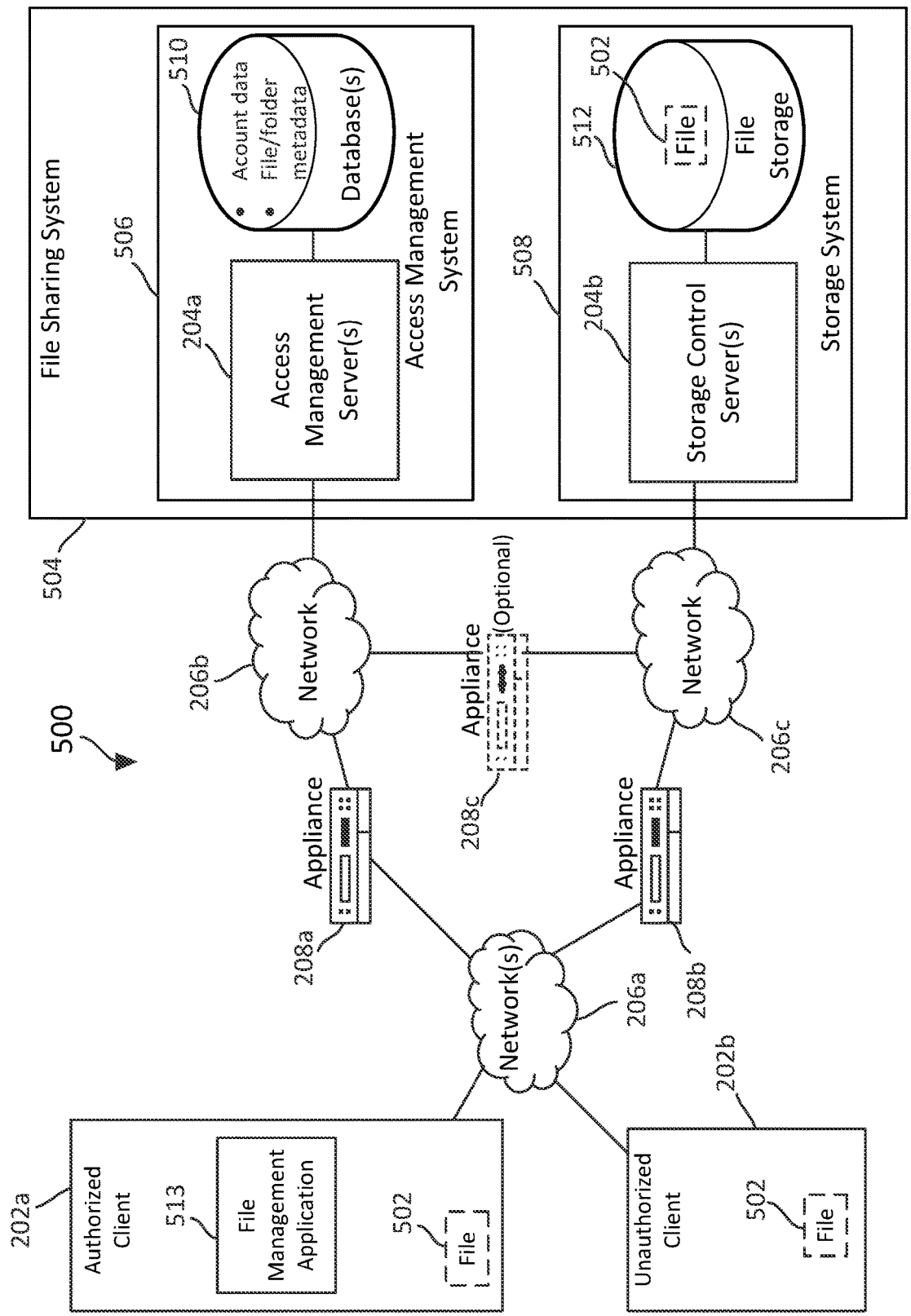
FIG. 5A is a diagram illustrating how a network computing environment like one shown in FIG. 2 may be configured to allow clients access to an example embodiment of a file sharing system.

FIG. 5A shows an example network environment 500 for allowing an authorized client 202a and/or an unauthorized client 202b to upload a file 502 to a file sharing system 504 or download a file 502 from the file sharing system 504. The authorized client 202a may, for example, be a client 202 operated by a user having an active account with the file sharing system 504, while the unauthorized client 202b may be operated by a user who lacks such an account. As shown, in some embodiments, the authorized client 202a may include a file management application 513 with which a user of the authorized client 202a may access and/or manage the accessibility of one or more files 502 via the file sharing system 504. The file management application 513 may, for example, be a mobile or desktop application installed on the authorized client 202a (or in a computing environment accessible by the authorized client). The ShareFile® mobile app and the ShareFile® desktop app offered by Citrix Systems, Inc., of Fort Lauderdale, FL, are examples of such preinstalled applications. In other embodiments, rather than being installed on the authorized client 202a, the file management application 513 may be executed by a web server (included with the file sharing system 504 or elsewhere) and provided to the authorized client 202a via one or more web pages.

As FIG. 5A illustrates, in some embodiments, the file sharing system 504 may include an access management system 506 and a storage system 508. As shown, the access management system 506 may include one or more access management servers 204a and a database 510, and the storage system 508 may include one or more storage control servers 204b and a storage medium(s) 512. In some embodiments, the access management server(s) 204a may, for example, allow a user of the file management application 513 to log in to his or her account, e.g., by entering a user name and password corresponding to account data stored in the database 510. Once the user of the client 202a has logged in, the access management server 204a may enable the user to view (via the authorized client 202a) information identifying various folders represented in the storage medium(s) 512, which is managed by the storage control server(s) 204b, as well as any files 502 contained within such folders. File/folder metadata stored in the database 510 may be used to identify the files 502 and folders in the storage medium(s) 512 to which a particular user has been provided access rights.

In some embodiments, the clients 202a, 202b may be connected to one or more networks 206a (which may include the Internet), the access management server(s) 204a may include webservers, and an appliance 208a may load balance requests from the authorized client 202a to such webservers. The database 510 associated with the access management server(s) 204a may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202a, 202b are shown is FIG. 5A as stand-alone computers, it should be appreciated that one or both of the clients 202a, 202b shown in FIG. 5A may instead represent other types of computing devices or systems that can be operated by users. In some embodiments, for example, one or both of the authorized client 202a and the unauthorized client 202b may be implemented as a server-based virtual computing environment that can be remotely accessed using a separate computing device operated by users, such as described above.

In some embodiments, the access management system 506 may be logically separated from the storage system 508, such that files 502 and other data that are transferred between clients 202 and the storage system 508 do not pass through the access management system 506. Similar to the access management server(s) 204a, one or more appliances 208b may load-balance requests from the clients 202a, 202b received from the network(s) 206a (which may include the Internet) to the storage control server(s) 204b. In some embodiments, the storage control server(s) 204b and/or the storage medium(s) 512 may be hosted by a cloud-based service provider (e.g., Amazon Web Services™ or Microsoft Azure™). In other embodiments, the storage control server(s) 204b and/or the storage medium(s) 512 may be located at a data center managed by an enterprise of a client 202, or may be distributed among some combination of a cloud-based system and an enterprise system, or elsewhere.

After a user of the authorized client 202a has properly logged in to an access management server 204a, the server 204a may receive a request from the client 202a for access to one of the files 502 or folders to which the logged in user has access rights. The request may either be for the authorized client 202a to itself to obtain access to a file 502 or folder or to provide such access to the unauthorized client 202b. In some embodiments, in response to receiving an access request from an authorized client 202a, the access management server 204a may communicate with the storage control server(s) 204b (e.g., either over the Internet via appliances 208a and 208b or via an appliance 208c positioned between networks 206b and 206c) to obtain a token generated by the storage control server 204b that can subsequently be used to access the identified file 502 or folder.

In some implementations, the generated token may, for example, be sent to the authorized client 202a, and the authorized client 202a may then send a request for a file 502, including the token, to the storage control server(s) 204b. In other implementations, the authorized client 202a may send the generated token to the unauthorized client 202b so as to allow the unauthorized client 202b to send a request for the file 502, including the token, to the storage control server(s) 204b. In yet other implementations, an access management server 204a may, at the direction of the authorized client 202a, send the generated token directly to the unauthorized client 202b so as to allow the unauthorized client 202b to send a request for the file 502, including the token, to the storage control server(s) 204b. In any of the forgoing scenarios, the request sent to the storage control server(s) 204b may, in some embodiments, include a uniform resource locator (URL) that resolves to an internet protocol (IP) address of the storage control server(s) 204b, and the token may be appended to or otherwise accompany the URL. Accordingly, providing access to one or more clients 202 may be accomplished, for example, by causing the authorized client 202a to send a request to the URL address, or by sending an email, text message or other communication including the token-containing URL to the unauthorized client 202b, either directly from the access management server(s) 204a or indirectly from the access management server(s) 204a to the authorized client 202a and then from the authorized client 202a to the unauthorized client 202b. In some embodiments, selecting the URL or a user interface element corresponding to the URL, may cause a request to be sent to the storage control server(s) 204b that either causes a file 502 to be downloaded immediately to the client that sent the request, or may cause the storage control server 204b to return a webpage to the client that includes a link or other user interface element that can be selected to effect the download.

In some embodiments, a generated token can be used in a similar manner to allow either an authorized client 202a or an unauthorized client 202b to upload a file 502 to a folder corresponding to the token. In some embodiments, for example, an "upload" token can be generated as discussed above when an authorized client 202a is logged in and a designated folder is selected for uploading. Such a selection may, for example, cause a request to be sent to the access management server(s) 204a, and a webpage may be returned, along with the generated token, that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In some embodiments, sending a request including such a token to the storage control server(s) 204b (e.g., by selecting a URL or user-interface element included in an email inviting the user to upload one or more files 502 to the file sharing system 504), a webpage may be returned that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In the described embodiments, the clients 202, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may correspond to respective computing systems, groups of computing systems, or networks of distributed computing systems, such as computing system 300 shown in FIG. 3.

As discussed above in connection with FIG. 5A, in some embodiments, a file sharing system may be distributed between two sub-systems, with one subsystem (e.g., the access management system 506) being responsible for controlling access to files 502 stored in the other subsystem (e.g., the storage system 508). FIG. 5B illustrates conceptually how one or more clients 202 may interact with two such subsystems.

Figure 5B:
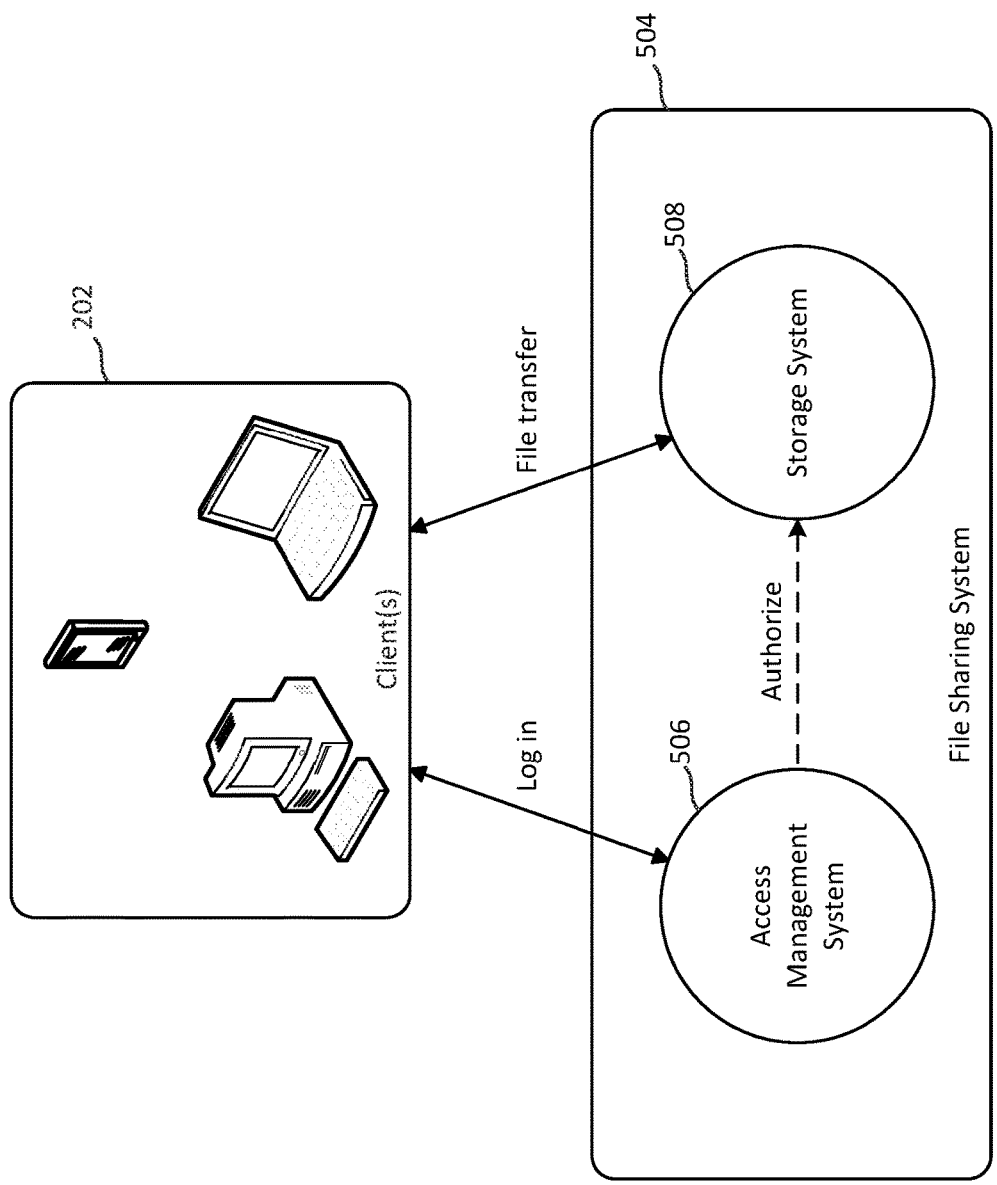
FIG. 5B is a diagram illustrating certain operations that may be performed by the file sharing system shown in FIG. 5A in accordance with some embodiments.

As shown in FIG. 5B, an authorized user operating a client 202, which may take on any of numerous forms, may log in to the access management system 506, for example, by entering a valid user name and password. In some embodiments, the access management system 506 may include one or more webservers that respond to requests from the client 202. The access management system 506 may store metadata concerning the identity and arrangements of files 502 (shown in FIG. 5A) stored by the storage system 508, such as folders maintained by the storage system 508 and any files 502 contained within such folders. In some embodiments, the metadata may also include permission metadata identifying the folders and files 502 that respective users are allowed to access. Once logged in, a user may employ a user-interface mechanism of the client 202 to navigate among folders for which the metadata indicates the user has access permission.

In some embodiments, the logged-in user may select a particular file 502 the user wants to access and/or to which the logged-in user wants a different user of a different client 202 to be able to access. Upon receiving such a selection from a client 202, the access management system 506 may take steps to authorize access to the selected file 502 by the logged-in client 202 and/or the different client 202. In some embodiments, for example, the access management system 506 may interact with the storage system 508 to obtain a unique "download" token which may subsequently be used by a client 202 to retrieve the identified file 502 from the storage system 508. The access management system 506 may, for example, send the download token to the logged-in client 202 and/or a client 202 operated by a different user. In some embodiments, the download token may a single-use token that expires after its first use.

In some embodiments, the storage system 508 may also include one or more webservers and may respond to requests from clients 202. In such embodiments, one or more files 502 may be transferred from the storage system 508 to a client 202 in response to a request that includes the download token. In some embodiments, for example, the download token may be appended to a URL that resolves to an IP address of the webserver(s) of the storage system 508. Access to a given file 502 may thus, for example, be enabled by a "download link" that includes the URL/token. Such a download link may, for example, be sent the logged-in client 202 in the form of a "DOWNLOAD" button or other user-interface element the user can select to effect the transfer of the file 502 from the storage system 508 to the client 202. Alternatively, the download link may be sent to a different client 202 operated by an individual with which the logged-in user desires to share the file 502. For example, in some embodiments, the access management system 506 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 506 and cut-and-paste or otherwise copy the download link into an email or other message the logged in user can then send to the other client 202 to enable the other client 202 to retrieve the file 502 from the storage system 508.

In some embodiments, a logged-in user may select a folder on the file sharing system to which the user wants to transfer one or more files 502 (shown in FIG. 5A) from the logged-in client 202, or to which the logged-in user wants to allow a different user of a different client 202 to transfer one or more files 502. Additionally or alternatively, the logged-in user may identify one or more different users (e.g., by entering their email addresses) the logged-in user wants to be able to access one or more files 502 currently accessible to the logged-in client 202.

Similar to the file downloading process described above, upon receiving such a selection from a client 202, the access management system 506 may take steps to authorize access to the selected folder by the logged-in client 202 and/or the different client 202. In some embodiments, for example, the access management system 506 may interact with the storage system 508 to obtain a unique "upload token" which may subsequently be used by a client 202 to transfer one or more files 502 from the client 202 to the storage system 508. The access management system 506 may, for example, send the upload token to the logged-in client 202 and/or a client 202 operated by a different user.

One or more files 502 may be transferred from a client 202 to the storage system 508 in response to a request that includes the upload token. In some embodiments, for example, the upload token may be appended to a URL that resolves to an IP address of the webserver(s) of the storage system 508. For example, in some embodiments, in response to a logged-in user selecting a folder to which the user desires to transfer one or more files 502 and/or identifying one or more intended recipients of such files 502, the access management system 506 may return a webpage requesting that the user drag-and-drop or otherwise identify the file(s) 502 the user desires to transfer to the selected folder and/or a designated recipient. The returned webpage may also include an "upload link," e.g., in the form of an "UPLOAD" button or other user-interface element that the user can select to effect the transfer of the file(s) 502 from the client 202 to the storage system 508.

In some embodiments, in response to a logged-in user selecting a folder to which the user wants to enable a different client 202 operated by a different user to transfer one or more files 502, the access management system 506 may generate an upload link that may be sent to the different client 202. For example, in some embodiments, the access management system 506 may send an email or other message to the different client 202 that includes a message indicating that the different user has been authorized to transfer one or more files 502 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 502 the different user wishes to upload to the file sharing system 504. The returned webpage may also include a user-interface element, e.g., in the form of an "UPLOAD" button, that the different user can select to effect the transfer of the file(s) 502 from the client 202 to the storage system 508. In other embodiments, the logged-in user may receive the upload link from the access management system 506 and may cut-and-paste or otherwise copy the upload link into an email or other message the logged-in user can then send to the different client 202 to enable the different client to upload one or more files 502 to the storage system 508.

In some embodiments, in response to one or more files 502 being uploaded to a folder, the storage system 508 may send a message to the access management system 506 indicating that the file(s) 502 have been successfully uploaded, and an access management system 506 may, in turn, send an email or other message to one or more users indicating the same. For user's that have accounts with the file sharing system 504, for example, a message may be sent to the account holder that includes a download link that the account holder can select to effect the transfer of the file 502 from the storage system 508 to the client 202 operated by the account holder. Alternatively, the message to the account holder may include a link to a webpage from the access management system 506 inviting the account holder to log in to retrieve the transferred files 502. Likewise, in circumstances in which a logged-in user identifies one or more intended recipients for one or more to-be-uploaded files 502 (e.g., by entering their email addresses), the access management system 506 may send a message including a download link to the designated recipients (e.g., in the manner described above), which such designated recipients can then use to effect the transfer of the file(s) 502 from the storage system 508 to the client(s) 202 operated by those designated recipients.

Figure 5C:
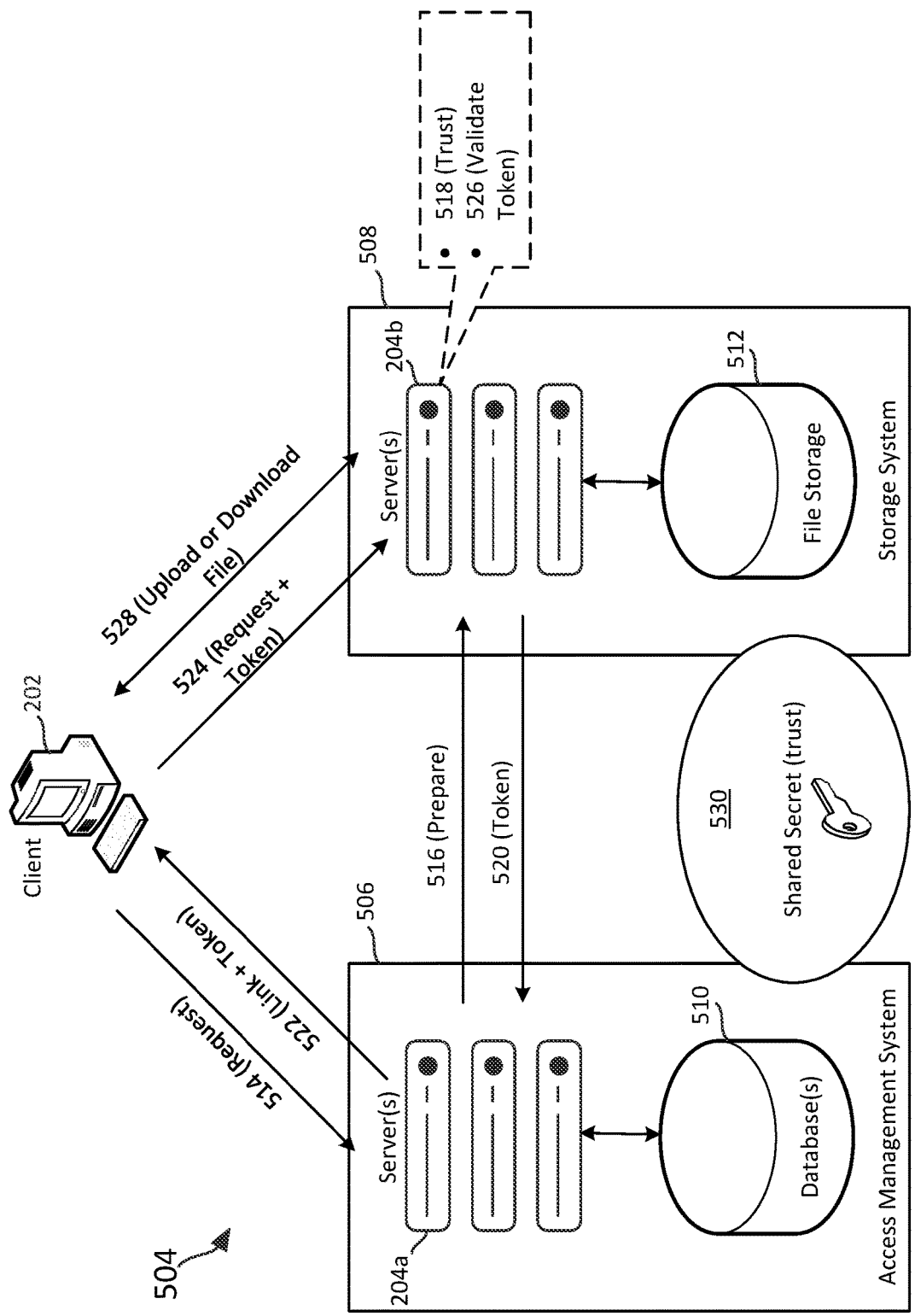
FIG. 5C is a diagram illustrating additional operations that may be performed by the file sharing system shown in FIG. 5A in accordance with some embodiments.

FIG. 5C is a block diagram showing an example of a process for generating access tokens (e.g., the upload tokens and download tokens discussed above) within the file sharing system 504 described in connection with FIGS. 5A and 5B.

As shown, in some embodiments, a logged-in client 202 may initiate the access token generation process by sending an access request 514 to the access management server(s) 204b. As noted above, the access request 514 may, for example, correspond to one or more of (A) a request to enable the downloading of one or more files 502 (shown in FIG. 5A) from the storage system 508 to the logged-in client 202, (B) a request to enable the downloading of one or more files 502 from the storage system 508 to a different client 202 operated by a different user, (C) a request to enable the uploading of one or more files 502 from a logged-in client 202 to a folder on the storage system 508, (D) a request to enable the uploading of one or more files 502 from a different client 202 operated by a different user to a folder of the storage system 508, (E) a request to enable the transfer of one or more files 502, via the storage system 508, from a logged-in client 202 to a different client 202 operated by a different user, or (F) a request to enable the transfer of one or more files 502, via the storage system 508, from a different client 202 operated by a different user to a logged-in client 202.

In response to receiving the access request 514, an access management server 204a may send a "prepare" message 516 to the storage control server(s) 204b of the storage system 508, identifying the type of action indicated in the request, as well as the identity and/or location within the storage medium(s) 512 of any applicable folders and/or files 502. As shown, in some embodiments, a trust relationship may be established (step 518) between the storage control server(s) 204b and the access management server(s) 204a. In some embodiments, for example, the storage control server(s) 204b may establish the trust relationship by validating a hash-based message authentication code (HMAC) based on shared secret or key 530).

After the trust relationship has been established, the storage control server(s) 204b may generate and send (step 520) to the access management server(s) 204a a unique upload token and/or a unique download token, such as those as discussed above.

After the access management server(s) 204a receive a token from the storage control server(s) 204b, the access management server(s) 204a may prepare and send a link 522 including the token to one or more client(s) 202. In some embodiments, for example, the link may contain a fully qualified domain name (FQDN) of the storage control server(s) 204b, together with the token. As discussed above, the link 522 may be sent to the logged-in client 202 and/or to a different client 202 operated by a different user, depending on the operation that was indicated by the request.

The client(s) 202 that receive the token may thereafter send a request 524 (which includes the token) to the storage control server(s) 204b. In response to receiving the request, the storage control server(s) 204b may validate (step 526) the token and, if the validation is successful, the storage control server(s) 204b may interact with the client(s) 202 to effect the transfer (step 528) of the pertinent file(s) 502, as discussed above.

F. Detailed Description of Example Embodiments of a System for Uploading Files Using Distributed Devices As described above (in Section A) in connection with FIGS. 1A-C, at a high level, a client device 202, such as the first device 102, may determine that a file (e.g., the file 108) is to be uploaded to a computing system (e.g., the computing system 100). As also described, in some implementations, the first device 102 may determine multiple client devices 202 are within a physical proximity of the first device 102 and may transmit different data portions (referred to herein as "chunks") of the file 108 to the individual client devices 202 of the multiple client devices 202. The computing system 100 may provide access and/or connection data to the multiple client devices 202 to enable peer-to-peer sharing of the distributed data chunks amongst those client devices 202. In some implementations, the computing system 100 may use the data chunks it receives from the multiple client device(s) 202 to reconstruct a complete copy of the file 108 and store the file 108, such as within the storage system 508 of the file sharing system 504.

FIGS. 6A-6D illustrate an example process for collaboratively uploading a file 108 to the computing system 100 using multiple client devices 202 (e.g., the first device 102, the second device 104, and a third device 602) within a proximity of one another, in accordance with some embodiments. Although three such client devices 202 are shown in FIGS. 6A-6D, it should be appreciated that additional or fewer client devices 202 may be employed in some circumstances. As noted above, in some embodiments, the computing system 100 may be part of the file sharing system 504 described in Section E. A user of a client device 202, such as the first device 102, may operate the client device 202 to request to upload the file 108 or set of files to a file server, such as the computing system 100. The first device 102 may use a client application, such as the file management application 513 described in Section E (in connection with FIG. 5A), to request the file upload to the computing system 100. In some implementations, upon registration of the client application with a client device 202, such as the first device 102, the client application may request and obtain permission to access the Bluetooth functionalities of the client device 202. The client application may collect device-specific information, such as a unique device identifier, the Media Access Control (MAC) address of the device, and possibly additional or different information for networking and/or communication. In some implementations, the device-specific information may be sent to the computing system 100 and stored, such as within the storage system 508 of the file sharing system 504.

Figure 6A:
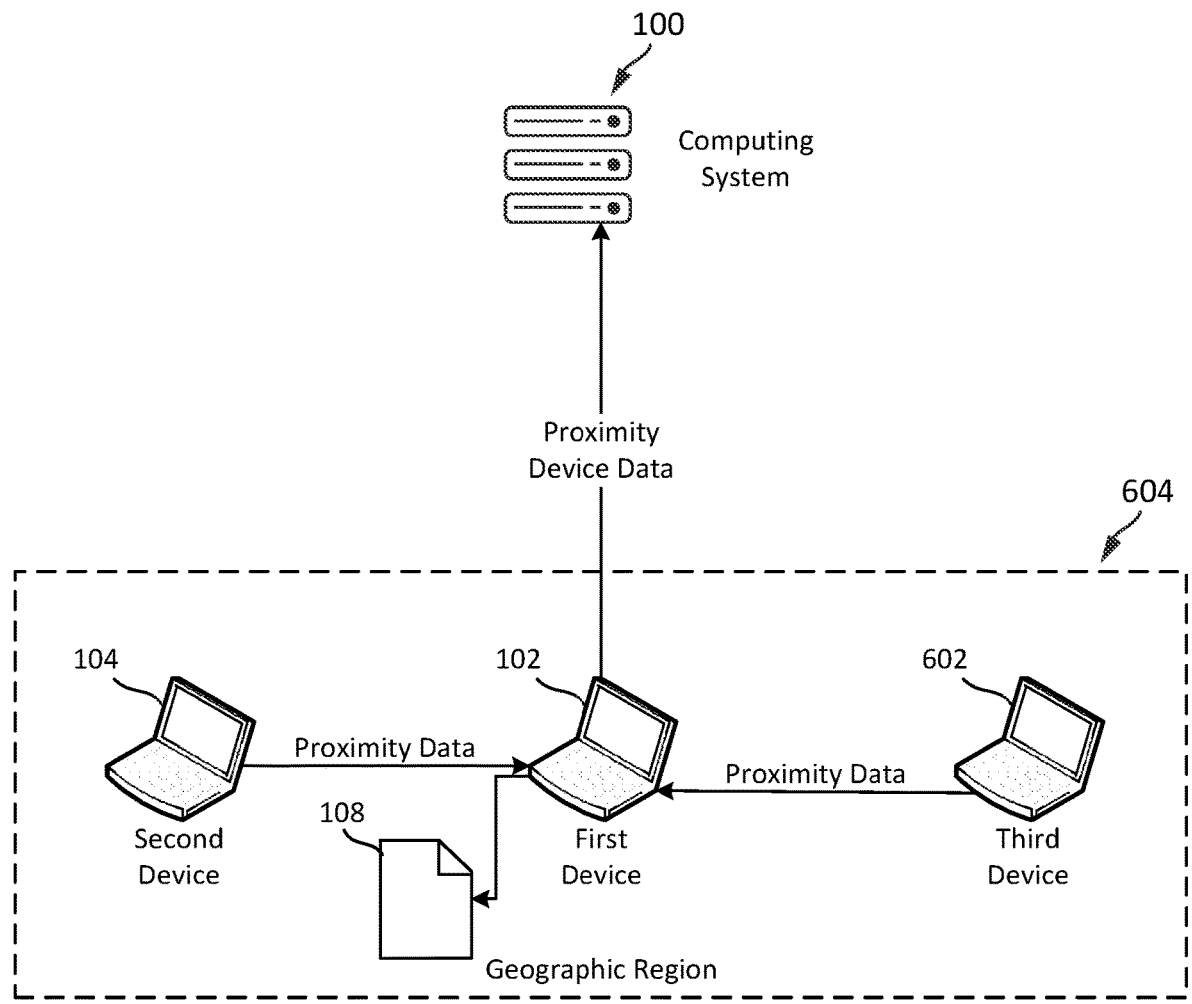
FIG. 6A illustrates a first step of an example process for collaboratively uploading a file to a computing system from multiple client devices within a proximity, in accordance with some embodiments.

As shown in FIG. 6A, in some implementations, upon receiving the upload request, such as via the client application, the first device 102 may attempt to identify other client devices 202 within a proximity of the first device 102 (e.g., the second device 104 and the third device 602). In some implementations, in response to receiving a user input requesting the uploading of a file, the client application may prompt the user for approval to take steps to identify other client devices 202 that are capable of participating in a collaborative uploading process for the file 108. For example, the client application of the first device 102 may display the prompt "Identify nearby devices for collaborative uploading?" and request either a "Yes" or a "No" response. In response to the user agreeing to take such steps, e.g., by providing a "Yes" response, the client application of the first device 102 may access a short range wireless radio of the first device 102, such as a Bluetooth or Wi-Fi transceiver, to identify one or more other devices, such as the second device 104 and the third device 602, which may be within a physical proximity of the first device 102. For example, as shown in FIG. 6A, the first device 102 may detect that the second device 104 and the third device 602 are located within the same geographic region 604 or are otherwise in close enough proximity to engage in wireless communication with one another.

In some implementations, the first device 102 may transmit data identifying the one or more devices detected within the proximity of the first device 102, such as a Bluetooth name or MAC address of the one or more other devices, to the computing system 100. In other implementations, the first device 102 may additionally or alternatively transmit the geographic location, such as GPS coordinates, of the first device 102 to the computing system 100. In either case, the data may be transmitted to the computing system 100. In some implementations, such data concerning individual client devices 202 may be encrypted before it is sent to the computing system 100.

Figure 6B:
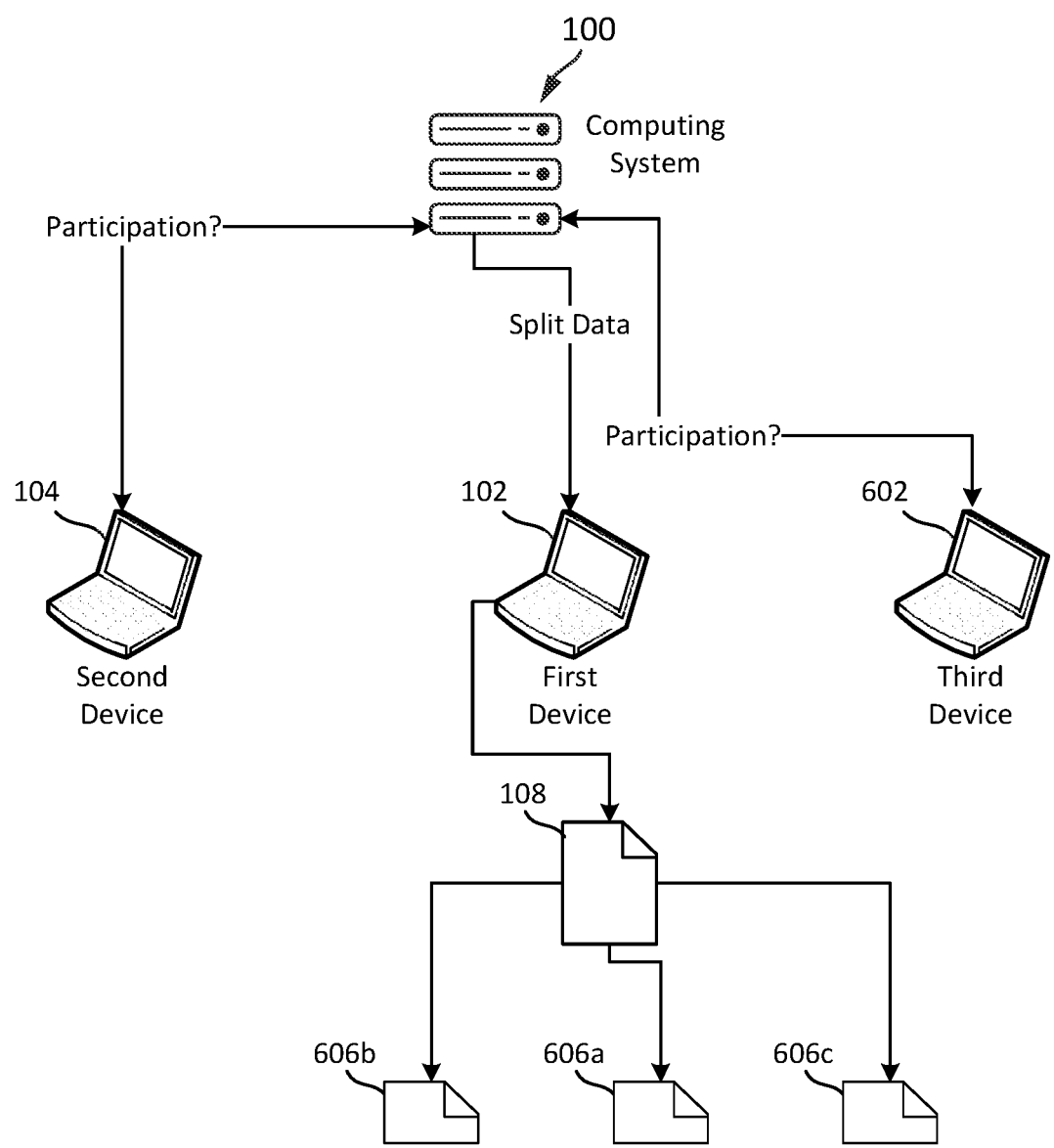
FIG. 6B illustrates a second step of an example process for collaboratively uploading a file to a computing system from multiple client devices within a proximity, in accordance with some embodiments.

Referring to FIG. 6B, in some implementations, upon receipt of the data identifying the one or more client devices 202 detected within the proximity of the first device 102, the computing system 100 may identify a subset of the one or more client devices 202 which have provided consent to participate in collaborative uploads. In some implementations, the computing system 100 may transmit a request for consent to participate in the collaborative upload to the one or more client devices 202 detected within the proximity of the first device 102. Upon receipt of the request, in some implementations, the client application of the respective client devices 202 (e.g., the second device 104 and the third device 602) may present a query for consent to participate. For example, the client application of the second device 104 may display the prompt "Participate in a collaborative upload?" and request either a "Yes" or a "No" response. In response to the user providing a response, the client application of the second device 104 may instruct the second device 104 to transmit the consent response to the computing system 100. In some implementations, one or more of the client devices 202 (e.g., the first device 102, the second device 104, and the third device 602) may provide participation consent beforehand, such as by identifying devices, users, groups of devices, or groups of users with which an individual client device 202 prospectively consents to participate in collaborative uploads. In such implementations, the computing system 100 need not transmit consent requests to the individual client devices 202 which have provided such prospective consent.

In some implementations, based upon the received participation consent and/or the previously provided consent, the computing system 100 may determine a subset of the nearby client devices 202 that are to participate in the collaborative uploading of the file 108 from the first device to the computing system 100. The computing system 100 may make such a determination in any of a number of ways. For example, in some implementations, the first device 102 may transmit data identifying the second device 104 and the third device 602 as being within a proximity of the first device 102. The computing system 100 may then identify second device 104 and/or the third device 602 as having provided consent to participate in a collaborative upload. The computing system 100 may transmit data back to the first device 102 identifying the second device 104 and/or the third device 602 as being within the subset of client devices 202 that are to participate in the collaborative upload. This group and/or subset of client devices 202 may be referred to as a "proximity group." In some implementations, the computing system 100 may transmit data identifying the individual client devices 202 in the determined proximity group to the first device 102.

In some implementations, the computing system 100 may additionally transmit to the first device 102 data identifying the number of client devices 202 in the determined proximity group. In some implementations, the client device 202 from the subset of client devices 202, or proximity group, that requested the file upload (e.g., the first device 102), may be identified as the "host" device. In some implementations, based upon the number of client devices 202 in the proximity group, the host device may divide the file 108 into file chunks, such as the file portions 606a, 606b, and 606c shown in FIG. 6B. In some implementations, the file portions 606 may be individually encrypted by the host device. In other implementations, the entirety of the file 108 may be encrypted by the host device prior to being divided into multiple chunks. In either case, the computing system 100 may provide the host device with a key (e.g., a public key) for encrypting the file 108 or the respective file portions 606a, 606b, and 606c.

Figure 6C:
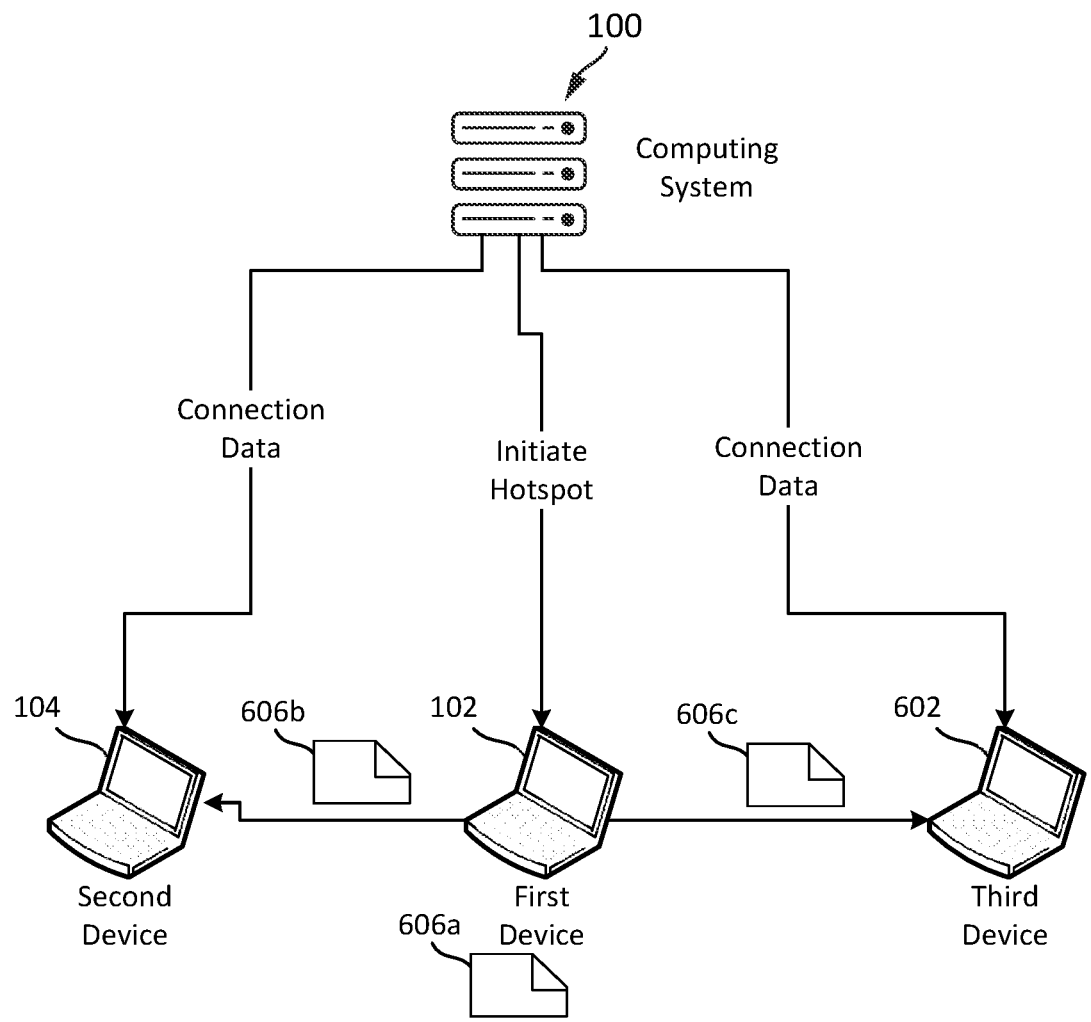
FIG. 6C illustrates a third step of an example process for collaboratively uploading a file to a computing system from multiple client devices within a proximity, in accordance with some embodiments.

As shown in FIG. 6C, in some implementations, the host device (e.g., the first device 102) may send respective file portions (e.g., the file portions 606b and 606c) to the non-host client devices 202 (e.g., the second device 104 and the third device 602) within the proximity group.

In some implementations, to facilitate such sharing of the file portions 606 amongst the client devices 202, the computing system 100 may provide instructions to the client applications of the client devices 202 in the proximity group to establish one or more wireless communications links (e.g., via one or more wireless peer-to-peer connections) amongst those client devices 202. For example, as described in more detail below, the computing system 100 may send instructions to the client application of the host device (e.g., the first device 102) to create a Wi-Fi hotspot and may send instructions to the client applications of the non-host client device(s) 202 (e.g., the second device 104 and the third device 602) to connect to that Wi-Fi hotspot. In response to the one or more non-host client devices 202 of the proximity group (e.g., the second device 104 and the third device 602) receiving the connection instructions, the client application(s) of those non-host client device(s) 202 may establish connections with the host device (e.g., the first device 102), such as by connecting to the Wi-Fi hotspot created by the host device.

After establishing a connection with the non-host client device(s) 202 (e.g., the second device 104 and the third device 602), such as via a Wi-Fi Hotspot, the host device (e.g., the first device 102) may transmit respective file chunks 606 to the non-host client device(s) 202. For example, as illustrated in FIG. 6C, the first device 102 may transmit the second file portion 606b to the second device 104 and may transmit the third file portion 606c to the third device 602. In some implementations, upon confirmation of a successful transmittal of the file portions 606 to the non-host client device(s) 202, the host device may terminate the wireless communication links, such as by disabling the Wi-Fi hotspot.

Figure 6D:
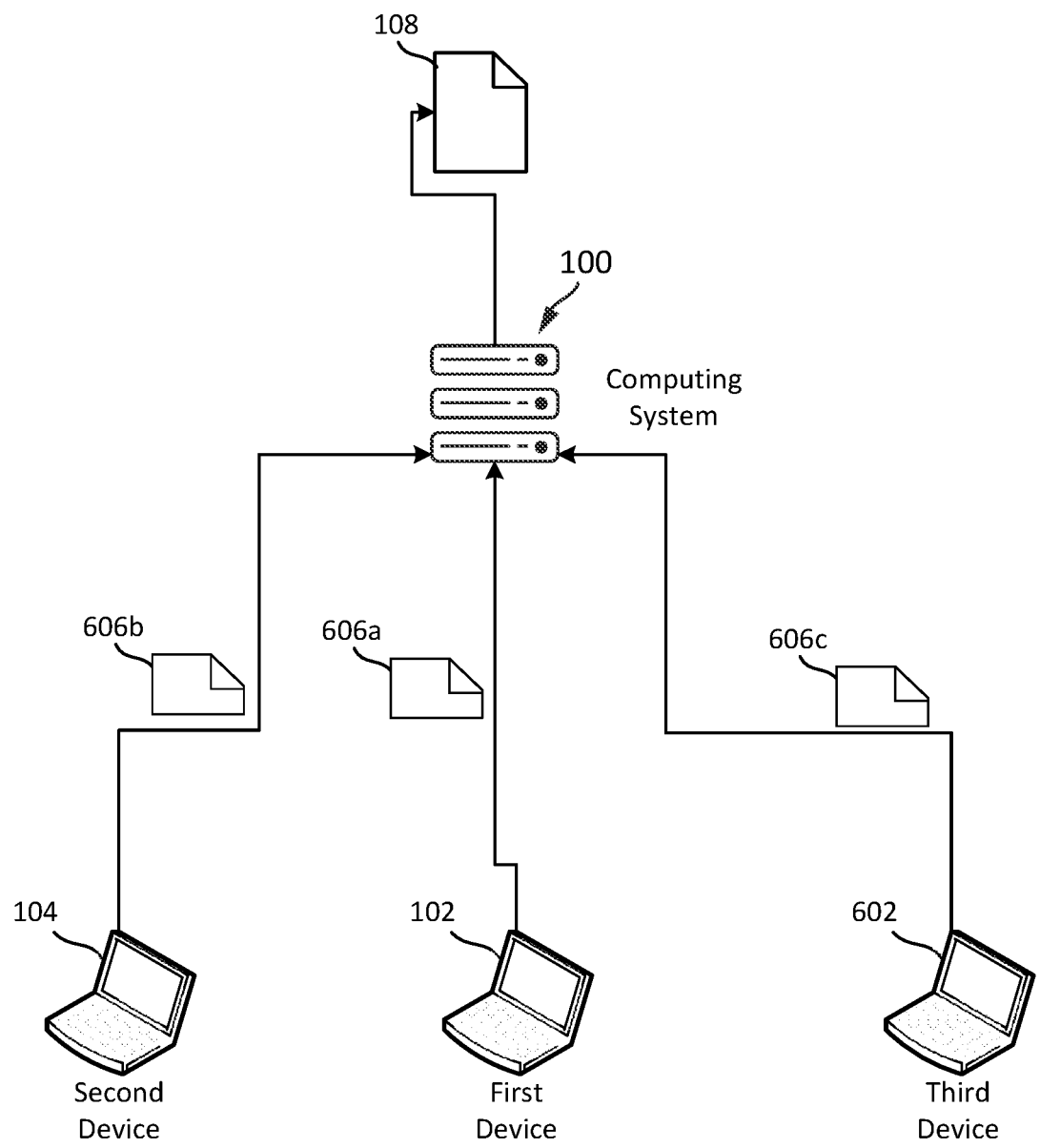
FIG. 6D illustrates a fourth step of an example process for collaboratively uploading a file to a computing system from multiple client devices within a proximity, in accordance with some embodiments.

As shown in FIG. 6D, in some implementations, the proximity group (e.g., the first device 102, the second device 104, and the third device 602) may send their respective file portions 606 to the computing system 100. For example, the first device 102 may send the first file portion 606a, the second device 104 may send the second file portion 606b, and the third device 602 may send the third file portion 606c. After the computing system 100 has received the file portions 606 from the proximity group, the computing system 100 may merge the different file chunks (e.g., the first file portion 606a, the second file portion 606b, and the third file portion 606c) to reconstruct the file 108. In some implementations, the received file portions 606 may be individually decrypted by the computing system 100 (e.g., using a private key corresponding to the public key that was used to encrypt the respective file portions 606) prior to merging them to generate the reconstructed file. In other implementations, the file 108 may be decrypted by the computing system 100 (e.g., using a private key corresponding to the public key that was used to encrypt the entire file 108 before it was divided into the file portions 606) after the file portions 606 have been merged to reconstruct the encrypted version of the file 108. In some implementations, the reconstructed file 108 may be stored at the computing system 100.

Figure 7A:
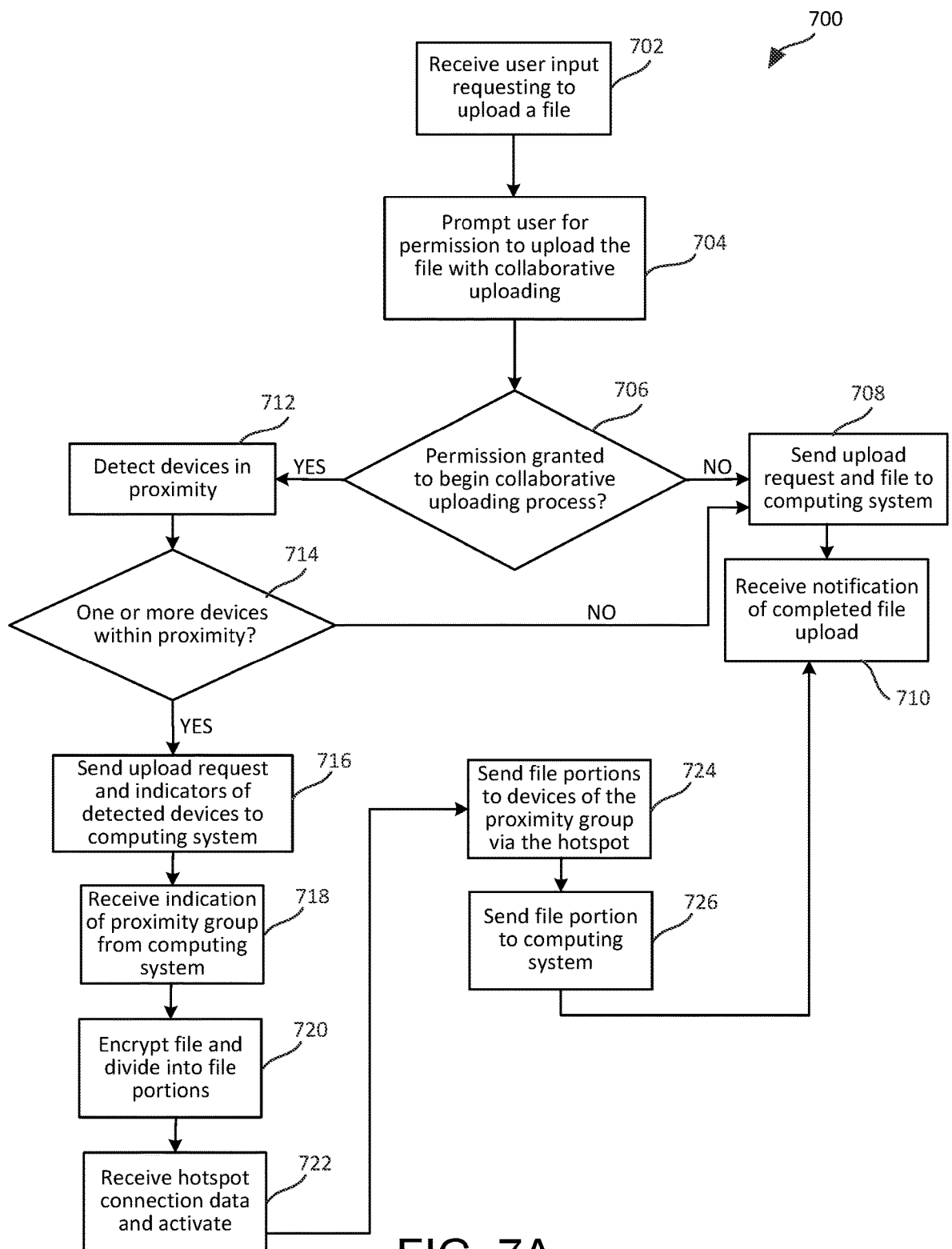
FIG. 7A illustrates an example routine that may be performed by an application of a client device shown in FIGS. 1A-1C and 6A-6D to initiate the collaborative uploading of a file or data object in accordance with some embodiments.

FIG. 7A illustrates an example routine 700 that may be performed by a client application requesting an upload of a file or data object using collaborative uploading, in accordance with some embodiments. In some implementations, a user may operate a client device 202 (e.g., the first device 102) to request an upload of a file from the user's client device 202 through a client application, such as the file management application 513 described in Section E (in connection with FIG. 5A). In some implementations, the client application may include a graphical user interface (GUI) providing navigation tools to identify a file on the client device 202 and request to upload the file, such as to the computing system 100.

As shown in FIG. 7A, in some implementations, the routine 700 may begin at a step 702, at which the client application may receive user input requesting to upload a file (e.g., the file 108), such as via the GUI of the client application. In response to receiving the user input requesting to upload the file, the routine 700 may proceed to a step 704, at which the client application may cause the client device 202 to output a prompt to the user, via the client application, for permission to begin a collaborative uploading process to upload the file to the computing system 100. As noted above, in some implementations, the client application may, for example, cause the client device 202 to display the prompt "Identify nearby devices for collaborative uploading?" and request either a "Yes" or a "No" response.

At a decision 706, the routine 700 may continue based on the permission indicator received from the user in response to the prompt. In some implementations, if the user does not grant permission to begin the collaborative uploading process, then, at a step 708, the client application may send a request to upload the entire file, as well the entirety of the file, to the computing system 100, e.g., the file sharing system 504. In such case, upon completion of the upload (as described below reference to FIG. 7B), the computing system 100 may send a notification of the completed file upload to client device 202 (e.g., per the step 756 of the routine 750 described below in connection with FIG. 7B) and, at a step 710 of the routine 700, the client application may receive the completed file upload notification.

In some implementations, if (per the decision 706) the client application determines that the user has granted permission to begin the collaborative uploading process, then, at a step 712 of the routine 700, the client application may direct the client device 202 to detect one or more client devices 202 (e.g., the second device 104 and the third device 602) within a proximity of the client device 202 (e.g., the first device 102). In some implementations, the detection of one or more client devices 202 within a proximity of one another may be performed using short range wireless radio, such as a Bluetooth or Wi-Fi transceiver.

At a decision 714, the routine 700 may continue based on the number of other client devices 202 detected within a proximity of the client device 202. If the client device 202 does not detect any other devices within its proximity, then the client application may determine that it is not possible for the file to uploaded using collaborative uploading. In some implementations, if no other client devices 202 are within a proximity, the routine 700 may proceed to the step 708, and the client application may send a request to upload the entire file, as well as the entirety of the file, to the computing system 100, e.g., the file sharing system 504. As described above, in such case, upon completion of the upload (as described below reference to FIG. 7B), the computing system 100 may send a notification of the completed file upload to client device 202 (e.g., per the step 756 of the routine 750 described below in connection with FIG. 7B) and, at a step 710 of the routine 700, the client application may receive the completed file upload notification.

In some implementations, if (per the decision 714) the client application determines that at least one other client device 202 was detected within a proximity of the client device 202, then, at a step 716, the client application may directed the client device 202 to send an upload request to the computing system 100, including indicator(s) of the other client device(s) 202 detected within a proximity of the client device 202 (per the step 712). As described below, the computing system 100 may use such indicators to determine a proximity group for the client device 202.

Figure 7B:
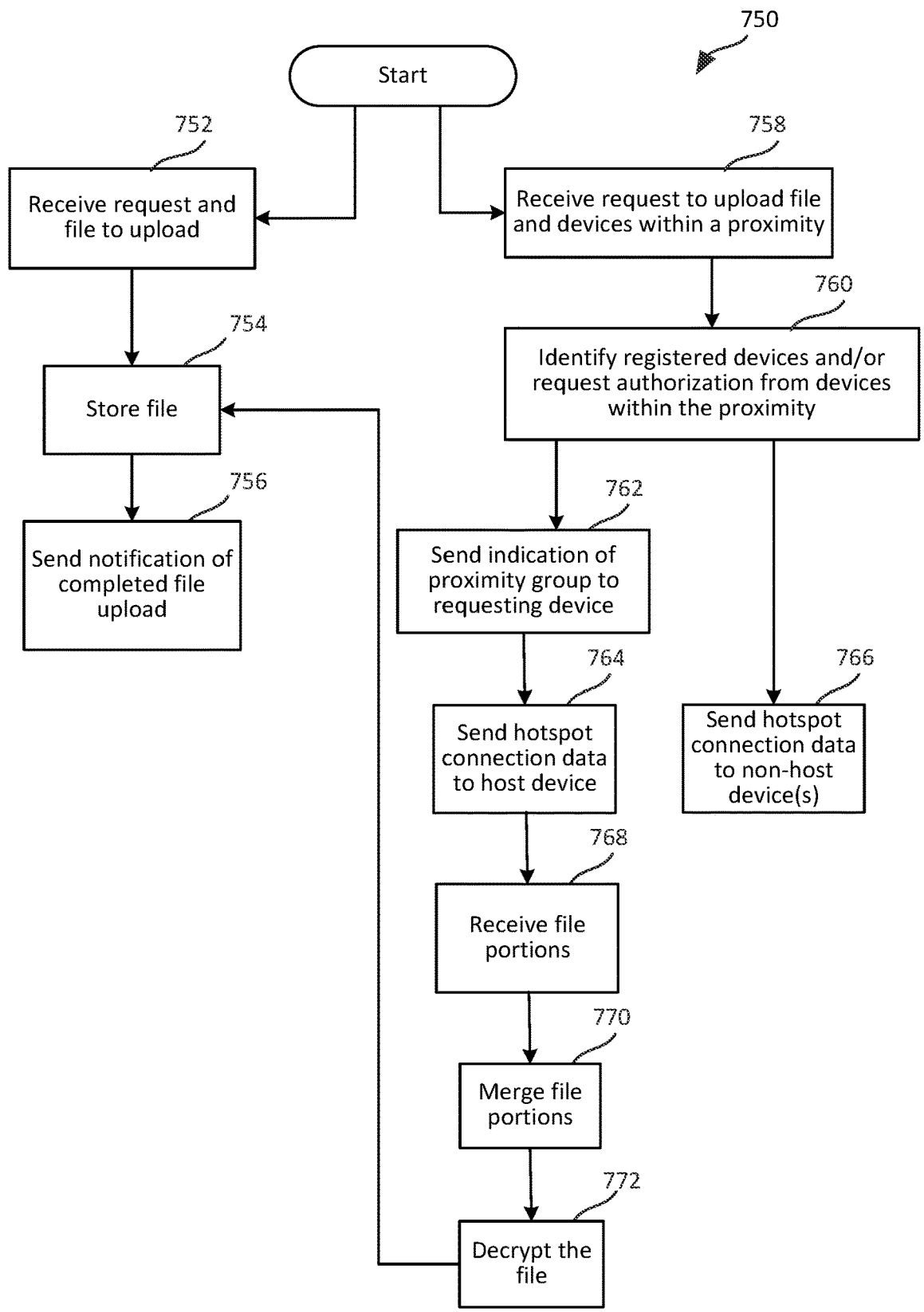
FIG. 7B illustrates an example routine that may be performed by the computing system shown in FIGS. 1A-1C and 6A-6D to orchestrate the collaborative uploading of a file or data object from a client device in accordance with some embodiments.

In some implementations, at a step 718, the client application may receive an indication of the determined proximity group, e.g., identifiers of the other client devices 202 and/or users operating such devices, from the computing system 100 (e.g., per the step 762 of the routine 750 shown in FIG. 7B). In some implementations, at a step 720, the client application may encrypt the file to be uploaded, such as with a public key provided by the computing system 100. Further, at the step 720, the client application may additionally divide the file into file portions based on the number of client devices 202 in the determined proximity group.

In some implementations, at a step 722 of the routine 700, the client application may receive information from the computing system 100 (e.g., per the step 764 of the routine 750 shown in FIG. 7B) for establishing and/or activating one or more communications links between the client device 202 and the other client devices 202 within the proximity group. For example, the computing system 100 may provide instructions to the client application for establishing a Wi-Fi hotspot, with such instructions indicating information such as the Wi-Fi hotspot name, a service set identifier (SSID) for the Wi-Fi hotspot, and a password for connecting to the Wi-Fi hotspot.

In some implementations, upon establishing and/or activating the one or more communications links between the client device 202 and the other client devices 202 within the proximity group, at a step 724, the client application may send respective file portions to individual ones the other client devices 202 of the proximity group. Further, at a step 726, the client application may additionally send a file portion directly to the computing system 100. Upon receiving and merging the file portions (as described below reference to FIG. 7B), the computing system 100 may send a notification of the completed file upload to client device 202 (e.g., per the step 756 of the routine 750 described below in connection with FIG. 7B) and, at the step 710, the client application may receive the completed file upload notification. Further details concerning how such collaborative uploading may be accomplished in some implementations are provided below in connection with FIGS. 8A-8C.

FIG. 7B illustrates an example routine 750 that may be performed by the computing system 100, e.g., the file sharing system 504, in conjunction with the example routine 700 (shown in FIG. 7A) that may be performed by client applications of one or more client devices 202, in accordance with some embodiments. As shown in FIG. 7B, some implementations, the routine 750 may begin either (A) at a step 752, at which the computing system 100 receives a request to upload an entire file 108, as well as the entirety of the file 108, from a client device 202, or (B) at a step 758 (described below). As shown in FIG. 7A, the computing system 100 may receive a request to upload the entirety of a file (per the step 752), for example, when the user does not grant permission to use the collaborative uploading process (per the step 704 of the routine 700) or when no other devices are detected within a proximity of the client device 202 (per the step 712 of the routine 700).

In some implementations, at a step 754 of the routine 750, the computing system 100 may store the file upon completing the upload request. In some implementations, the computing system 100 may, for example, store the file to a central repository of the file sharing system 504, such as the storage medium(s) 512 of the storage system 508, as shown in FIGS. 5A-C. Further, in some implementations, upon completion of the upload and storage of the file, the computing system 100, at a step 756, may send a notification of the completed file upload to the client device 202. As noted above in connection with FIG. 7A, the client application of the requesting client device 202 may receive such a notification at the step 710 of the routine 700.

At the step 758 of the routine 750, the computing system 100 may receive a request to upload the file using collaborative uploading. In some implementations, the file upload request received per the step 758 may include indicators of detected client devices 202 within a proximity of the requesting client devices 202, such as the indicators sent by the client application at the step 716 of the routine 700 (shown in FIG. 7A).

At a step 760 of the routine 750, the computing system 100 may, in some implementations, use the indicators received from the requesting client device 202 (per the step 758) to identify registered devices and/or request authorization from devices within the proximity to determine a set of client devices 202 that are to participate in the collaborative upload, e.g., by determining a proximity group, as described above. As noted above, in some implementations, one or more of the client devices 202 may have previously established permissions with the computing system 100, such as providing prior authorization to participate in collaborative uploads. In some implementations, one or more client devices 202 may not have provided prior authorization, and, in such case, the computing system 100 may send a request to such client device(s) 202 to participate in the collaborative upload of the file.

In some implementations, at a step 762, an indication of the proximity group may be sent to the requesting client device 202. As noted above in connection with FIG. 7A, the client application of the requesting client device 202 may receive such an indication at the step 718 of the routine 700. In some implementations, the computing system 100 may send identifiers of the other client devices 202 and/or users operating such devices in the proximity group to the requesting client device 202.

At a step 764 of the routine 750, the computing system 100 may send information to the client device 202 for establishing and/or activating one or more communications links between the client device 202 and the other client devices 202 within the proximity group. As noted above in connection with FIG. 7A, the client application of the requesting client device 202 may receive such information at the step 722 of the routine 700. For example, the computing system 100 may provide instructions to the client application for establishing a Wi-Fi hotspot, with such instructions indicating information such as the Wi-Fi hotspot name, a service set identifier (SSID) for the Wi-Fi hotspot, and a password for connecting to the Wi-Fi hotspot. Additionally, at a step 766, the computing system 100 may send data for connecting to the host device to the one or more other client devices 202 in the proximity group (e.g., the second device 104 and the third device 602). Continuing the example of using a Wi-Fi hotspot, the one or more other client devices 202 may receive information such as the Wi-Fi hotspot name and the password for connecting to the Wi-Fi hotspot of the host device.

In some implementations, at a step 768, the computing system 100 may receive respective portions of the file from the client devices 202 within the proximity group, such as the file portions sent by the client application to the other client devices 202 (per the step 724 of the routine 700 shown in FIG. 7A), and the file portion the client application sent directly to the computing system 100 (per the step 726 of the routine 700 shown in FIG. 7A). At a step 770, the computing system 100 may merge the received file portions to reconstruct a copy of the file. In some implementations, if the file is encrypted (e.g., using a public key the computing system 100 provided to the client application of the host device), then, at a step 772, the computing system 100 may decrypt the file (e.g., using a private key corresponding to the public key provide to the host device).

In some implementations, at a step 754 of the routine 750, the computing system 100 may store the file. In some implementations, the computing system 100 may, for example, store the file to a central repository of the file sharing system 504, such as the storage medium(s) 512 of the storage system 508, as shown in FIGS. 5A-C. In some implementations, upon completion of the upload and storage of the file, the computing system 100, at a step 756 of the routine 750, may send a notification of the completed file upload to the client device 202. As noted above in connection with FIG. 7A, the client application of the requesting client device 202 may receive such a notification at the step 710 of the routine 700.

Figure 8A:
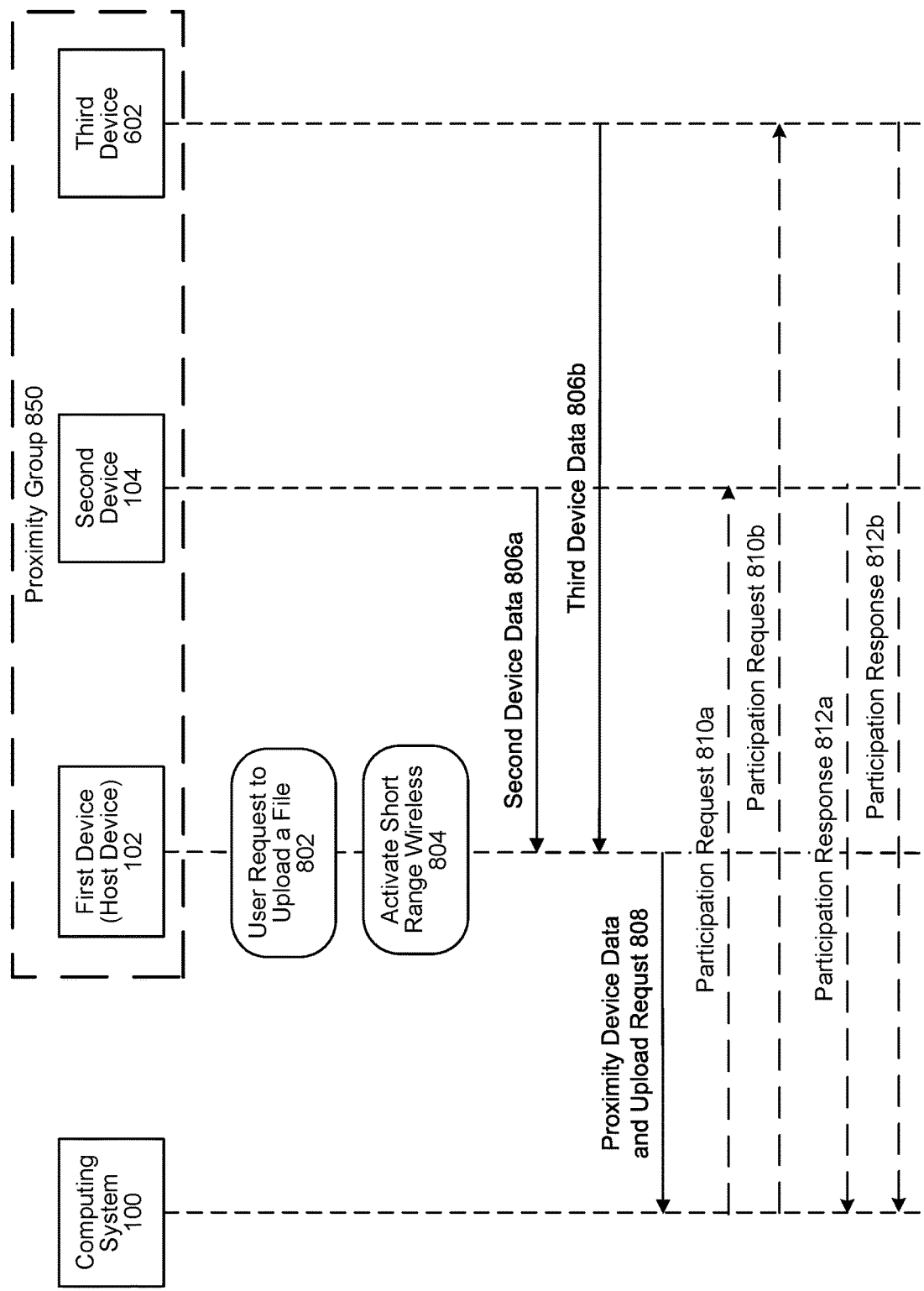
FIG. 8A illustrates a first portion of an example process for collaboratively uploading a file to a computing system from multiple client devices based on a proximity of the client devices, in accordance with some embodiments.
Figure 8B:
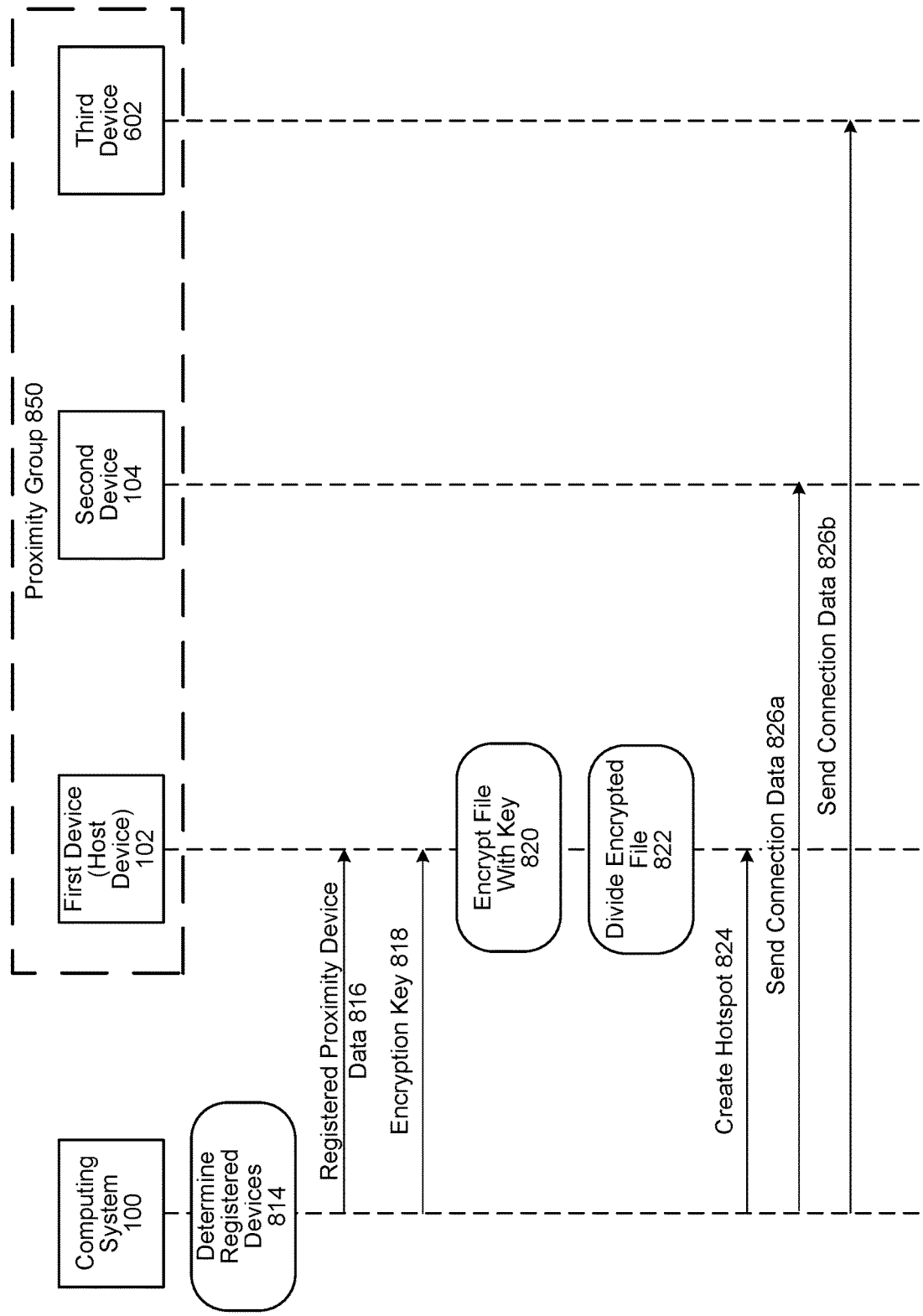
FIG. 8B illustrates a second portion of the example process partially depicted in FIG. 8A.
Figure 8C:
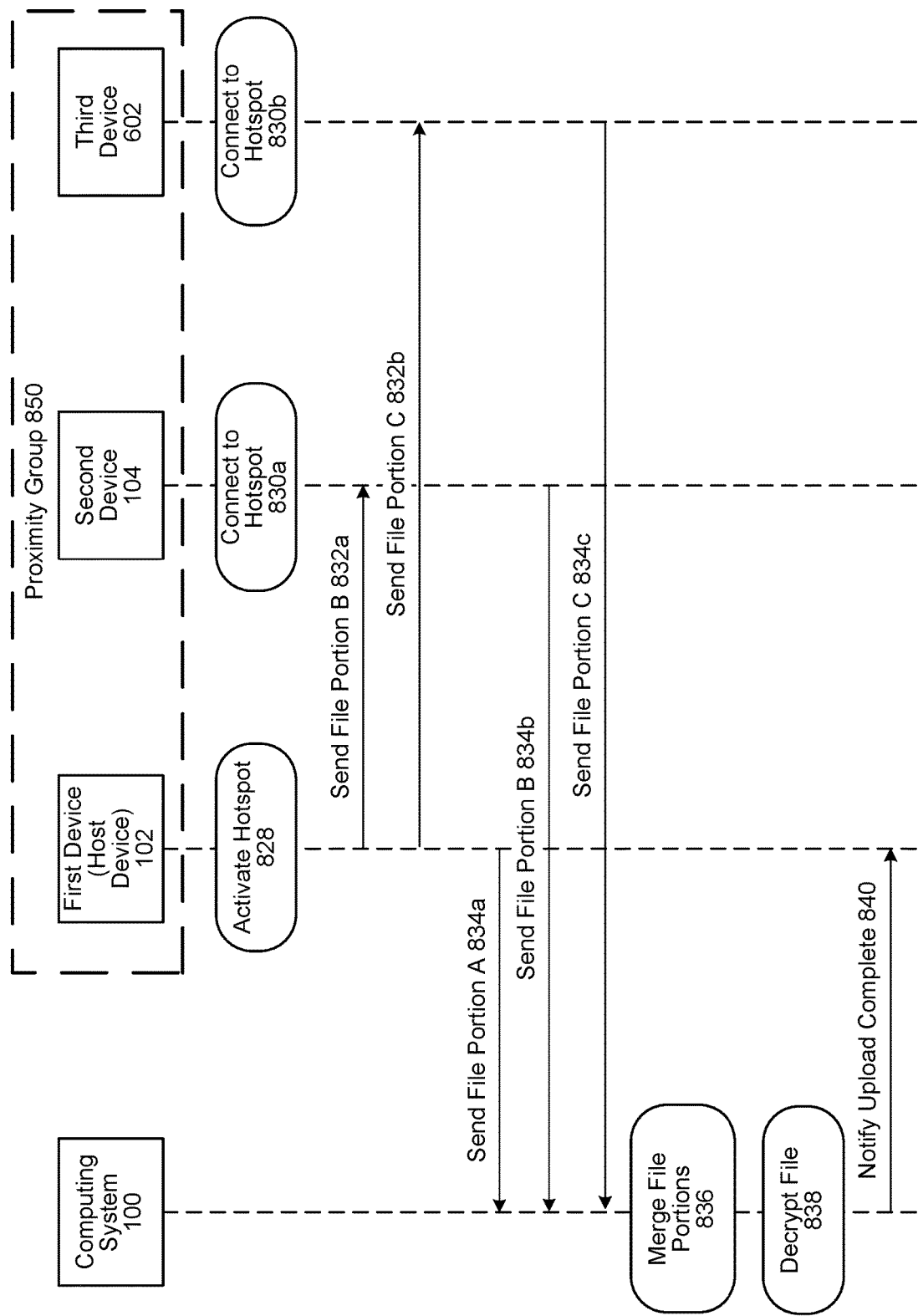
FIG. 8C illustrates a third portion of the example process partially depicted in FIG. 8A.

FIGS. 8A-8C illustrate an example process for a file upload through collaborative uploading based on a proximity of client devices 202, in accordance with some embodiments. The example process illustrated in FIGS. 8A-8C may involve three client devices 202 (e.g., the first device 102, the second device 104, and the third device 602) identified as a proximity group 850 (shown in FIGS. 8A-8C). Although three such client devices 202 (e.g., the first device 102, the second device 104, and the third device 602) are shown in FIGS. 8A-8C, it should be appreciated that additional or fewer client devices 202 may be employed in some implementations. As described above with reference to FIGS. 7A-7B, the proximity group 850 may include client devices 202 that may have provided permission to participate in collaborative uploading and are located within a proximity of one another. The proximity may be a range in which the client devices 202 of the proximity group 850 may communicate (e.g., via one or more wireless peer-to-peer connections) with the other client devices 202 of the proximity group, such as through a Wi-Fi hotspot.

As described in reference to FIG. 7A, a client device 202 (e.g., the first device 102) may receive (802) a request from a user, such as via a client application, to upload the file 108 to the computing system 100. In some implementations, based on receiving the request, the host device (e.g., the first device 102) may activate (804) a short range wireless radio, such as a Bluetooth or Wi-Fi transceiver, per instructions received from the client application. In some implementations, the host device (e.g., the first device 102) may detect one or more client devices 202 within a proximity of the host device (e.g., the first device 102) using the short range wireless radio.

In some implementations, the host device (e.g., the first device 102) may receive data identifying client devices 202 within a physical proximity of the host device via the short range wireless radio. Referring to FIG. 8A, the host device (e.g., the first device 102) may receive (806a) data identifying a second client device 202 (e.g., the second device 104) and may receive (806b) data identifying a third client device 202 (e.g., the third device 602). In response to receiving the proximity device data via the short range wireless radio, the host device (e.g., the first device 102) may send (808) the proximity device data and the request to upload the file 108 to the computing system 100.

In some implementations, the computing system 100 may determine whether one or the more of the identified client devices 202 are to participate in the collaborative upload. Client devices 202 may have previously established permissions with the computing system 100, such as providing prior authorization to participate in collaborative uploads. In some implementations, a client device 202 identified in the proximity device data may not have provided prior authorization. In such cases, the computing system 100 may send (810a, 810b) a request to those client devices 202 (e.g., the second device 104 and the third device 602) to participate in the collaborative upload of file 108. The client application of the client devices 202 (e.g., the second device 104 and the third device 602) may prompt the user for permission to participate in the collaborative upload, such as previously described with reference to FIG. 6B. In some implementations, the client devices 202 (e.g., the second device 104 and the third device 602) may send (812a, 812b) the participation response to the computing system 100.

Referring to FIG. 8B, in some implementations, based on the prior authorization and/or the received participation response, the computing system 100 may determine (814) the registered client devices 202 within the proximity group 850 (e.g., the first device 102, the second device 104, and the third device 602). In some implementations, the computing system 100 may send (816) the registered proximity device data to the first device 102. The registered proximity device data may include an indication of the number of client devices 202 in the proximity group 850.

To ensure privacy and security, in some implementations, the file portions and/or an entirety of the file 108 may be encrypted (804) using encryption algorithms such as Rivest-Shamir-Adleman (RSA) encryption or Triple Data Encryption Standard (DES) encryption. The computing system 100 may provide such privacy and security for the upload of the file 108 by sending (818) an encryption key (e.g., a public key corresponding to a private key held by the computing system 100) to the first device 102. Subsequently, the host device (e.g., the first device 102) may use that key to encrypt (820) the file portions and/or an entirety of the file 108. In some implementations, the host device (e.g., the first device 102) may divide (822) the file 108 into file portions, referred to above as "chunks." The number of file portions may be based on the number of client devices 202 in a proximity group 850, as provided in the registered proximity device data received from the computing system 100.

In some implementations, the computing system 100 may send (824) information to the host device (e.g., the first device 102) for establishing communications links between the host device (e.g., the first device 102) and the other client devices 202 of the proximity group 850 (e.g., the second device 104 and the third device 602). For example, the computing system 100 may provide instructions to the host device for establishing a Wi-Fi hotspot, with the instructions indicating information such as the Wi-Fi hotspot name, a service set identifier (SSID) for the Wi-Fi hotspot, and a password for connecting to the Wi-Fi hotspot. In some implementations, computing system 100 may send (826a, 826b) data for connecting to the host device (e.g., the first device 102) to the one or more other client devices 202 in the proximity group 850 (e.g., the second device 104 and the third device 602). Continuing the example of using a Wi-Fi hotspot, the one or more other client devices 202 may receive information such as the Wi-Fi hotspot name and the password for connecting to the Wi-Fi hotspot of the host device.

Referring next to FIG. 8C, in some implementations, the host device (e.g., the first device 102) may activate (828) a wireless connection point, such as a Wi-Fi hotspot, using the instructions provided (824) by the computing system 100. The one or more other client devices 202 of the proximity group 850 may connect (830a, 830b) to the wireless connection point, such as a Wi-Fi hotspot, using the data provided (826a, 826b) by the computing system 100. In response to the client devices 202 of the proximity group 850 establishing a connection with the host device (e.g., the first device 102), the host device may send (832a, 832b) respective file portions to the individual client devices 202 (e.g., the second device 104 and the third device 602). For example, the first device 102 may send (832a) "File Portion B" to the second device 104 and the first device 102 may send (832a) "File Portion C" to the third device 602.

In some implementations, upon receiving their respective file portions, the client devices 202 of the proximity group 850 may send (834a, 834b, 834c) those file portions to the computing system 100. For example, the first device 102 may send (834a) "File Portion A" to the computing system 100, the second device 104 may send (834b) "File Portion B" to the computing system 100, and the third device 602 may send (834c) "File Portion C" to the computing system 100.

In some implementations, upon receiving the file portions of the file 108, the computing system may merge (836) the file portions (e.g., "File Portion A," "File Portion B," and "File Portion C") to reconstruct a representation of the requested file 108. In some implementations, if the entirety of the file 108 was encrypted by the host device (e.g., the first device 102) prior to being divided into multiple chunks, the computing system may decrypt (838) the reassembled chunks to yield a copy of the original file 108. The computing system 100 may, for example, perform such decryption using a private key corresponding to the public key that the computing system 100 sent (818) to the host device (e.g., the first device 102). In other implementations, if the file chunks were separately encrypted by the computing system 100 prior to sending them to the respective client devices 202, the computing system 100 may use a key (e.g., a private key corresponding to the public key that the computing system 100 sent (818) to the host device) to decrypt respective chunks of the file, prior to merging the various chunks to reconstruct the file 108.

In some implementations, the computing system 100 may determine if any file portions were not received. If the computing system 100 determines that any file portions were not received from a client device 202, the computing system 100 may request the missing file portions from the host device (e.g., the first device 102). In some implementations, upon determination that the file 108 has been successfully reconstructed, the computing system 100 may notify (840) the host device (e.g., the first device 102) that the upload of the file 108 has completed.

G. Example Implementations of Methods, Systems, and Computer-Readable Media in Accordance with the Present Disclosure The following paragraphs (M1) through (M19) describe examples of methods that may be implemented in accordance with the present disclosure.

(M1) A method may be performed that involves determining, by a computing system, that a file is to be uploaded from a first remote device to the computing system; sending, from the computing system to the first remote device, first data to enable a wireless connection to be established between the first remote device and a second remote device; receiving, by the computing system and from the first remote device, a first portion of the file; receiving, by the computing system and from the second remote device, a second portion of the file, the second remote device having received the second portion of the file from the first remote device via the wireless connection; and merging, by the computing system, the first portion of the file and the second portion of the file to generate a copy of the file.

(M2) A method may be performed as described in paragraph (M1), and may further involve sending, from the computing system to the second remote device, second data to enable the second remote device to establish the wireless connection with the first remote device.

(M3) A method may be performed as described in paragraph (M2), and may further involve configuring, by the computing system, the first data to cause the first remote device to establish a wireless network to which the second remote device can connect, and configuring, by the computing system, the second data to cause the second remote device to connect to the wireless network established by the first remote device.

(M4) A method may be performed as described in paragraph (M2) or paragraph (M3), and may further involve receiving, by the computing system and from the first remote device, a first indication that the second remote device is within a proximity of the first remote device; and determining, by the computing system, to send the second data to the second remote device based at least in part on the first indication.

(M5) A method may be performed as described in any of paragraphs (M2) through (M4), and may further involve sending, from the computing system to the second remote device, third data that causes the second remote device to output a prompt requesting authorization for the second remote device to be used to assist in uploading the file from the first remote device to the computing system; and receiving, by the computing system and from the second remote device, a second indication that the second remote device received the authorization; wherein determining to send the second data to the second remote device may be further based at least in part on the second indication.

(M6) A method may be performed as described in any of paragraphs (M1) through (M5), and may further involve sending, from the computing system to the first remote device, a first key to encrypt the first portion of the file and the second portion of the file; and decrypting, by the computing system and using a second key, the first portion of the file and the second portion of the file.

(M7) A method may be performed that involves determining, by a computing system, that a file is to be uploaded from a first remote device to the computing system; determining, by the computing system, that at least a second remote device is available to assist the first remote device in uploading the file to the computing system; receiving, by the computing system and from the first remote device, a first portion of the file; receiving, by the computing system and from the second remote device, a second portion of the file, the second remote device having received the second portion of the file from the first remote device; and merging, by the computing system, the first portion of the file and the second portion of the file to generate a copy of the file.

(M8) A method may be performed as described in paragraph (M7), and may further involve determining, by the computing system, that the second remote device is within a proximity of the first remote device; wherein determining that the second remote device is available to assist the first remote device in uploading the file to the computing system may be based at least in part on the second remote device being within the proximity of the first remote device.

(M9) A method may be performed as described in paragraph (M8), and may further involve receiving, by the computing system and from the first remote device, a first indication that the second remote device is within the proximity of the first remote device; wherein determining that the second remote device is within the proximity of the first remote device may be based at least in part on the first indication.

(M10) A method may be performed as described in paragraph (M8) or paragraph (M9), and may further involve sending, from the computing system to the second remote device, data that causes the second remote device to output a prompt requesting authorization for the second remote device to be used to assist in uploading the file from the first remote device to the computing system; and receiving, by the computing system and from the second remote device, a second indication that the second remote device received the authorization; wherein determining that the second remote device is available to assist the first remote device in uploading the file to the computing system may be based at least in part on the second indication.

(M11) A method may be performed as described in any of paragraphs (M7) through (M10), and may further involve sending, from the computing system to the first remote device, first data to enable a wireless connection to be established between the first remote device and the second remote device.

(M12) A method may be performed as described in paragraph (M11), and may further involve sending, from the computing system to the second remote device, second data to enable the second remote device to establish the wireless connection with the first remote device.

(M13) A method may be performed as described in paragraph (M12), and may further involve configuring, by the computing system, the first data to cause the first remote device to establish a wireless network to which the second remote device can connect, and configuring, by the computing system, the second data to cause the second remote device to connect to the wireless network established by the first remote device.

(M14) A method may be performed as described in any of paragraphs (M7) through (M13), and may further involve sending, from the computing system to the first remote device, a first key to encrypt the first portion of the file and the second portion of the file; and decrypting, by the computing system and using a second key, the first portion of the file and the second portion of the file.

(M15) A method may be performed that involves determining, by a first device, that a file is to be uploaded from the first device to a remote computing system; establishing, by the first device, a wireless connection with at least a second device in proximity of the first device; dividing, by the first device, the file into at least a first portion and a second portion; sending, from the first device to the second device via the wireless connection, the first portion of the file; and sending, from the first device and to the remote computing system, the second portion of the file.

(M16) A method may be performed as described in paragraph (M15), and may further involve determining, by the first device, that at least the second device is within a proximity of the first device; sending, from the first device to the remote computing system, an indication that the second device is within the proximity; and after sending the indication, receiving, by the first device and from the remote computing system, first data to enable the wireless connection to be established between the first device and the second device.

(M17) A method may be performed as described in paragraph (M16), wherein determining that the second device is within the proximity may involve detecting a Bluetooth transmission identifying the second device.

(M18) A method may be performed as described in paragraph (M16) or paragraph (M17), and may further involve receiving, by the first device and from the remote computing system, an instruction to use the first data to establish a wireless network to enable the wireless connection with the second device.

(M19) A method may be performed as described in any of paragraphs (M15) through (M18), and may further involve receiving, by the first device and from the remote computing system, a first key to encrypt the first portion of the file and the second portion of the file; and encrypting, by the first device and using the first key, the first portion of the file and the second portion of the file.

The following paragraphs (S1) through (S19) describe examples of systems and devices that may be implemented in accordance with the present disclosure.

(S1) A computing system may include at least one processor, and at least one computer-readable medium encoded with instructions which, when executed by the at least one processor, cause the computing system to determine that a file is to be uploaded from a first remote device to the computing system, to send, to the first remote device, first data to enable a wireless connection to be established between the first remote device and a second remote device, to receive, from the first remote device, a first portion of the file, to receive, from the second remote device, a second portion of the file, the second remote device having received the second portion of the file from the first remote device via the wireless connection, and to merge the first portion of the file and the second portion of the file to generate a copy of the file.

(S2) A computing system may be configured as described in paragraph (S1), wherein the at least one computer-readable medium may be further encoded with additional instructions which, when executed by the at least one processor, further cause the computing system to send, to the second remote device, second data to enable the second remote device to establish the wireless connection with the first remote device.

(S3) A system may be configured as described in paragraph (S2), wherein the at least one computer-readable medium may be further encoded with additional instructions which, when executed by the at least one processor, further cause the computing system to configure the first data to cause the first remote device to establish a wireless network to which the second remote device can connect, and to configure the second data to cause the second remote device to connect to the wireless network established by the first remote device.

(S4) A system may be configured as described in paragraph (S2) or paragraph (S3), wherein the at least one computer-readable medium may be further encoded with additional instructions which, when executed by the at least one processor, further cause the computing system to receive, from the first remote device, a first indication that the second remote device is within a proximity of the first remote device, and to determine to send the second data to the second remote device based at least in part on the first indication.

(S5) A system may be configured as described in any of paragraphs (S2) through (S4), wherein the at least one computer-readable medium may be further encoded with additional instructions which, when executed by the at least one processor, further cause the computing system to send, to the second remote device, third data that causes the second remote device to output a prompt requesting authorization for the second remote device to be used to assist in uploading the file from the first remote device to the computing system, to receive, from the second remote device, a second indication that the second remote device received the authorization, and to determine to send the second data to the second remote device further based at least in part on the second indication.

(S6) A system may be configured as described in any of paragraphs (S1) through (S5), wherein the at least one computer-readable medium may be further encoded with additional instructions which, when executed by the at least one processor, further cause the computing system to send, to the first remote device, a first key to encrypt the first portion of the file and the second portion of the file, and to decrypt, using a second key, the first portion of the file and the second portion of the file.

(S7) A computing system may include at least one processor, and at least one computer-readable medium encoded with instructions which, when executed by the at least one processor, cause the computing system to determine that a file is to be uploaded from a first remote device to the computing system, to determine that at least a second remote device is available to assist the first remote device in uploading the file to the computing system, to receive, from the first remote device, a first portion of the file, to receive, from the second remote device, a second portion of the file, the second remote device having received the second portion of the file from the first remote device, and to merge the first portion of the file and the second portion of the file to generate a copy of the file.

(S8) A computing system may be configured as described in paragraph (S7), wherein the at least one computer-readable medium may be further encoded with additional instructions which, when executed by the at least one processor, further cause the computing system to determine that the second remote device is within a proximity of the first remote device, and to determine that the second remote device is available to assist the first remote device in uploading the file to the computing system based at least in part on the second remote device being within the proximity of the first remote device.

(S9) A computing system may be configured as described in paragraph (S8), wherein the at least one computer-readable medium may be further encoded with additional instructions which, when executed by the at least one processor, further cause the computing system to receive, from the first remote device, a first indication that the second remote device is within the proximity of the first remote device, and to determine that the second remote device is within the proximity of the first remote device based at least in part on the first indication.

(S10) A computing system may be configured as described in paragraph (S8) or paragraph (S9), wherein the at least one computer-readable medium may be further encoded with additional instructions which, when executed by the at least one processor, further cause the computing system to send, to the second remote device, data that causes the second remote device to output a prompt requesting authorization for the second remote device to be used to assist in uploading the file from the first remote device to the computing system, to receive, from the second remote device, a second indication that the second remote device received the authorization, and to determine that the second remote device is available to assist the first remote device in uploading the file to the computing system based at least in part on the second indication.

(S11) A computing system may be configured as described in any of paragraphs (S7) through (S10), wherein the at least one computer-readable medium may be further encoded with additional instructions which, when executed by the at least one processor, further cause the computing system to send, to the first remote device, first data to enable a wireless connection to be established between the first remote device and the second remote device.

(S12) A computing system may be configured as described in paragraph (S11), wherein the at least one computer-readable medium may be further encoded with additional instructions which, when executed by the at least one processor, further cause the computing system to send, to the second remote device, second data to enable the second remote device to establish the wireless connection with the first remote device.

(S13) A computing system may be configured as described in paragraph (S12), wherein the at least one computer-readable medium may be further encoded with additional instructions which, when executed by the at least one processor, further cause the computing system to configure the first data to cause the first remote device to establish a wireless network to which the second remote device can connect, and to configure the second data to cause the second remote device to connect to the wireless network established by the first remote device.

(S14) A computing system may be configured as described in any of paragraphs (S7) through (S13), wherein the at least one computer-readable medium may be further encoded with additional instructions which, when executed by the at least one processor, further cause the computing system to send, to the first remote device, a first key to encrypt the first portion of the file and the second portion of the file, and to decrypt, using a second key, the first portion of the file and the second portion of the file.

(S15) A first device may include at least one processor, and at least one computer-readable medium encoded with instructions which, when executed by the at least one processor, cause the first device to determine that a file is to be uploaded from the first device to a remote computing system, to establish a wireless connection with at least a second device in proximity of the first device, to divide the file into at least a first portion and a second portion, to send, to the second device via the wireless connection, the first portion of the file, and to send, to the remote computing system, the second portion of the file.

(S16) A first device may be configured as described in paragraph (S15), wherein the at least one computer-readable medium may be further encoded with additional instructions which, when executed by the at least one processor, further cause the first device to determine that at least the second device is within a proximity of the first device, to send, to the remote computing system, an indication that the second device is within the proximity, and to receive, from the remote computing system and after sending the indication, first data to enable the wireless connection to be established between the first device and the second device.

(S17) A first device may be configured as described in paragraph (S16), wherein the at least one computer-readable medium may be further encoded with additional instructions which, when executed by the at least one processor, further cause the first device to determine that the second device is within the proximity based at least in part on detecting a Bluetooth transmission identifying the second device.

(S18) A first device may be configured as described in paragraph (S16) or paragraph (S17), wherein the at least one computer-readable medium may be further encoded with additional instructions which, when executed by the at least one processor, further cause the first device to receive, from the remote computing system, an instruction to use the first data to establish a wireless network to enable the wireless connection with the second device.

(S19) A first device may be configured as described in any of paragraphs (S15) through (S18), wherein the at least one computer-readable medium may be further encoded with additional instructions which, when executed by the at least one processor, further cause the first device to receive, from the remote computing system, a first key to encrypt the first portion of the file and the second portion of the file, and to encrypt, and using the first key, the first portion of the file and the second portion of the file.

The following paragraphs (CRM1) through (CRM19) describe examples of computer-readable media that may be implemented in accordance with the present disclosure.

(CRM1) At least one non-transitory computer-readable medium may be encoded with instructions which, when executed by the at least one processor of a computing system, cause the computing system to determine that a file is to be uploaded from a first remote device to the computing system, to send, to the first remote device, first data to enable a wireless connection to be established between the first remote device and a second remote device, to receive, from the first remote device, a first portion of the file, to receive, from the second remote device, a second portion of the file, the second remote device having received the second portion of the file from the first remote device via the wireless connection, and to merge the first portion of the file and the second portion of the file to generate a copy of the file.

(CRM2) At least one non-transitory computer-readable medium may be configured as described in paragraph (CRM1), and may be further encoded with additional instructions which, when executed by the at least one processor, further cause the computing system to send, to the second remote device, second data to enable the second remote device to establish the wireless connection with the first remote device.

(CRM3) At least one non-transitory computer-readable medium may be configured as described in paragraph (CRM2), and may be further encoded with additional instructions which, when executed by the at least one processor, further cause the computing system to configure the first data to cause the first remote device to establish a wireless network to which the second remote device can connect, and to configure the second data to cause the second remote device to connect to the wireless network established by the first remote device.

(CRM4) At least one non-transitory computer-readable medium may be configured as described in paragraph (CRM2) or paragraph (CRM3), and may be further encoded with additional instructions which, when executed by the at least one processor, further cause the computing system to receive, from the first remote device, a first indication that the second remote device is within a proximity of the first remote device, and to determine to send the second data to the second remote device based at least in part on the first indication.

(CRM5) At least one non-transitory computer-readable medium may be configured as described in any of paragraphs (CRM2) through (CRM4), and may be further encoded with additional instructions which, when executed by the at least one processor, further cause the computing system to send, to the second remote device, third data that causes the second remote device to output a prompt requesting authorization for the second remote device to be used to assist in uploading the file from the first remote device to the computing system, to receive, from the second remote device, a second indication that the second remote device received the authorization, and to determine to send the second data to the second remote device further based at least in part on the second indication.

(CRM6) At least one non-transitory computer-readable medium may be configured as described in any of paragraphs (CRM1) through (CRM5), and may be further encoded with additional instructions which, when executed by the at least one processor, further cause the computing system to send, to the first remote device, a first key to encrypt the first portion of the file and the second portion of the file, and to decrypt, using a second key, the first portion of the file and the second portion of the file.

(CRM7) At least one non-transitory computer-readable medium may be encoded with instructions which, when executed by the at least one processor of a computing system, cause the computing system to determine that a file is to be uploaded from a first remote device to the computing system, to determine that at least a second remote device is available to assist the first remote device in uploading the file to the computing system, to receive, from the first remote device, a first portion of the file, to receive, from the second remote device, a second portion of the file, the second remote device having received the second portion of the file from the first remote device, and to merge the first portion of the file and the second portion of the file to generate a copy of the file.

(CRM8) At least one non-transitory computer-readable medium may be configured as described in paragraph (CRM7), and may be further encoded with additional instructions which, when executed by the at least one processor, further cause the computing system to determine that the second remote device is within a proximity of the first remote device, and to determine that the second remote device is available to assist the first remote device in uploading the file to the computing system based at least in part on the second remote device being within the proximity of the first remote device.

(CRM9) At least one non-transitory computer-readable medium may be configured as described in paragraph (CRM8), and may be further encoded with additional instructions which, when executed by the at least one processor, further cause the computing system to receive, from the first remote device, a first indication that the second remote device is within the proximity of the first remote device, and to determine that the second remote device is within the proximity of the first remote device based at least in part on the first indication.

(CRM10) At least one non-transitory computer-readable medium may be configured as described in paragraph (CRM8) or paragraph (CRM9), and may be further encoded with additional instructions which, when executed by the at least one processor, further cause the computing system to send, to the second remote device, data that causes the second remote device to output a prompt requesting authorization for the second remote device to be used to assist in uploading the file from the first remote device to the computing system, to receive, from the second remote device, a second indication that the second remote device received the authorization, and to determine that the second remote device is available to assist the first remote device in uploading the file to the computing system based at least in part on the second indication.

(CRM11) At least one non-transitory computer-readable medium may be configured as described in any of paragraphs (CRM7) through (CRM10), and may be further encoded with additional instructions which, when executed by the at least one processor, further cause the computing system to send, to the first remote device, first data to enable a wireless connection to be established between the first remote device and the second remote device.

(CRM12) At least one non-transitory computer-readable medium may be configured as described in paragraph (CRM11), and may be further encoded with additional instructions which, when executed by the at least one processor, further cause the computing system to send, to the second remote device, second data to enable the second remote device to establish the wireless connection with the first remote device.

(CRM13) At least one non-transitory computer-readable medium may be configured as described in paragraph (CRM12), and may be further encoded with additional instructions which, when executed by the at least one processor, further cause the computing system to configure the first data to cause the first remote device to establish a wireless network to which the second remote device can connect, and to configure the second data to cause the second remote device to connect to the wireless network established by the first remote device.

(CRM14) At least one non-transitory computer-readable medium may be configured as described in any of paragraphs (CRM7) through (CRM13), and may be further encoded with additional instructions which, when executed by the at least one processor, further cause the computing system to send, to the first remote device, a first key to encrypt the first portion of the file and the second portion of the file, and to decrypt, using a second key, the first portion of the file and the second portion of the file.

(CRM15) At least one non-transitory computer-readable medium may be encoded with instructions which, when executed by the at least one processor of a first device, cause the first device to determine that a file is to be uploaded from the first device to a remote computing system, to establish a wireless connection with at least a second device in proximity of the first device, to divide the file into at least a first portion and a second portion, to send, to the second device via the wireless connection, the first portion of the file, and to send, to the remote computing system, the second portion of the file.

(CRM16) At least one non-transitory computer-readable medium may be configured as described in paragraph (CRM15), and may be further encoded with additional instructions which, when executed by the at least one processor, further cause the first device to determine that at least the second device is within a proximity of the first device, to send, to the remote computing system, an indication that the second device is within the proximity, and to receive, from the remote computing system and after sending the indication, first data to enable the wireless connection to be established between the first device and the second device.

(CRM17) At least one non-transitory computer-readable medium may be configured as described in paragraph (CRM16), and may be further encoded with additional instructions which, when executed by the at least one processor, further cause the first device to determine that the second device is within the proximity based at least in part on detecting a Bluetooth transmission identifying the second device.

(CRM18) At least one non-transitory computer-readable medium may be configured as described in paragraph (CRM15) or paragraph (CRM17), and may be further encoded with additional instructions which, when executed by the at least one processor, further cause the first device to receive, from the remote computing system, an instruction to use the first data to establish a wireless network to enable the wireless connection with the second device.

(CRM19) At least one non-transitory computer-readable medium may be configured as described in any of paragraphs (CRM15) through (CRM18), and may be further encoded with additional instructions which, when executed by the at least one processor, further cause the first device to receive, from the remote computing system, a first key to encrypt the first portion of the file and the second portion of the file, and to encrypt, and using the first key, the first portion of the file and the second portion of the file.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a computing system, that a file is to be uploaded from a first remote device to the computing system;
   sending, from the computing system to the first remote device, first data to enable a wireless connection to be established between the first remote device and a second remote device;
   receiving, by the computing system and from the first remote device, a first portion of the file;
   receiving, by the computing system and from the second remote device, a second portion of the file, the second remote device having received the second portion of the file from the first remote device via the wireless connection; and
   merging, by the computing system, the first portion of the file and the second portion of the file to generate a copy of the file.

2. The method of claim 1, further comprising:
   sending, from the computing system to the second remote device, second data to enable the second remote device to establish the wireless connection with the first remote device.

3. The method of claim 2, further comprising:
   configuring, by the computing system, the first data to cause the first remote device to establish a wireless network to which the second remote device can connect, and
   configuring, by the computing system, the second data to cause the second remote device to connect to the wireless network established by the first remote device.

4. The method of claim 2, further comprising:
   receiving, by the computing system and from the first remote device, a first indication that the second remote device is within a proximity of the first remote device; and
   determining, by the computing system, to send the second data to the second remote device based at least in part on the first indication.

5. The method of claim 4, further comprising:
   sending, from the computing system to the second remote device, third data that causes the second remote device to output a prompt requesting authorization for the second remote device to be used to assist in uploading the file from the first remote device to the computing system; and
   receiving, by the computing system and from the second remote device, a second indication that the second remote device received the authorization;
   wherein determining to send the second data to the second remote device is further based at least in part on the second indication.

6. The method of claim 2, further comprising:
   sending, from the computing system to the second remote device, third data that causes the second remote device to output a prompt requesting authorization for the second remote device to be used to assist in uploading the file from the first remote device to the computing system;

receiving, by the computing system and from the second remote device, an indication that the second remote device received the authorization; and determining, by the computing system, to send the second data to the second remote device based at least in part on the indication.

7. The method of claim 1, further comprising:

sending, from the computing system to the first remote device, a first key to encrypt the first portion of the file and the second portion of the file; and decrypting, by the computing system and using a second key, the first portion of the file and the second portion of the file.

8. A method, comprising:

determining, by a computing system, that a file is to be uploaded from a first remote device to the computing system;

determining, by the computing system, that at least a second remote device is available to assist the first remote device in uploading the file to the computing system;

receiving, by the computing system and from the first remote device, a first portion of the file;

receiving, by the computing system and from the second remote device, a second portion of the file, the second remote device having received the second portion of the file from the first remote device; and merging, by the computing system, the first portion of the file and the second portion of the file to generate a copy of the file.

9. The method of claim 8, further comprising:

determining, by the computing system, that the second remote device is within a proximity of the first remote device;

wherein determining that the second remote device is available to assist the first remote device in uploading the file to the computing system is based at least in part on the second remote device being within the proximity of the first remote device.

10. The method of claim 9, further comprising:

receiving, by the computing system and from the first remote device, a first indication that the second remote device is within the proximity of the first remote device;

wherein determining that the second remote device is within the proximity of the first remote device is based at least in part on the first indication.

11. The method of claim 10, further comprising:

sending, from the computing system to the second remote device, data that causes the second remote device to output a prompt requesting authorization for the second remote device to be used to assist in uploading the file from the first remote device to the computing system; and receiving, by the computing system and from the second remote device, a second indication that the second remote device received the authorization;

wherein determining that the second remote device is available to assist the first remote device in uploading the file to the computing system is based at least in part on the second indication.

12. The method of claim 8, further comprising:

sending, from the computing system to the first remote device, first data to enable a wireless connection to be established between the first remote device and the second remote device.

13. The method of claim 12, further comprising:

sending, from the computing system to the second remote device, second data to enable the second remote device to establish the wireless connection with the first remote device.

14. The method of claim 13, wherein:

configuring, by the computing system, the first data to cause the first remote device to establish a wireless network to which the second remote device can connect, and configuring, by the computing system, the second data to cause the second remote device to connect to the wireless network established by the first remote device.

15. The method of claim 8, further comprising:

sending, from the computing system to the first remote device, a first key to encrypt the first portion of the file and the second portion of the file; and decrypting, by the computing system and using a second key, the first portion of the file and the second portion of the file.

16. A method, comprising:

determining, by a first device, that a file is to be uploaded from the first device to a remote computing system;

establishing, by the first device, a wireless connection with at least a second device in proximity of the first device;

dividing, by the first device, the file into at least a first portion and a second portion;

sending, from the first device to the second device via the wireless connection, the first portion of the file; and sending, from the first device and to the remote computing system, the second portion of the file.

17. The method of claim 16, further comprising:

determining, by the first device, that at least the second device is within a proximity of the first device;

sending, from the first device to the remote computing system, an indication that the second device is within the proximity; and after sending the indication, receiving, by the first device and from the remote computing system, first data to enable the wireless connection to be established between the first device and the second device.

18. The method of claim 17, wherein determining that the second device is within the proximity comprises:

detecting a Bluetooth transmission identifying the second device.

19. The method of claim 17, further comprising:

receiving, by the first device and from the remote computing system, an instruction to use the first data to establish a wireless network to enable the wireless connection with the second device.

20. The method of claim 16, further comprising:

receiving, by the first device and from the remote computing system, a first key to encrypt the first portion of the file and the second portion of the file; and encrypting, by the first device and using the first key, the first portion of the file and the second portion of the file.

* * * * *